(12) United States Patent
Nishida

(10) Patent No.: US 11,003,286 B2
(45) Date of Patent: May 11, 2021

(54) TOUCH PANEL SYSTEM, INTERCOMMUNICATION-TYPE TOUCH PANEL SYSTEM AND RECORDING MEDIUM

(71) Applicant: NETAPPLI CO., LTD., Ishikawa (JP)

(72) Inventor: Makoto Nishida, Ishikawa (JP)

(73) Assignee: NETAPPLI CO., LTD., Ishikawa (JP)

( * ) Notice: Subject to any disclaimer, the term of this patent is extended or adjusted under 35 U.S.C. 154(b) by 0 days.

(21) Appl. No.: 17/048,486

(22) PCT Filed: Sep. 19, 2019

(86) PCT No.: PCT/JP2019/036704
§ 371 (c)(1),
(2) Date: Oct. 16, 2020

(87) PCT Pub. No.: WO2020/059780
PCT Pub. Date: Mar. 26, 2020

(65) Prior Publication Data
US 2021/0109626 A1    Apr. 15, 2021

(30) Foreign Application Priority Data
Sep. 20, 2018   (JP) .............................. JP2018-175500

(51) Int. Cl.
*G06F 3/042*   (2006.01)
*G06F 3/046*   (2006.01)

(52) U.S. Cl.
CPC ............ *G06F 3/0425* (2013.01); *G06F 3/046* (2013.01); *G06F 2203/04102* (2013.01); *G06F 2203/04106* (2013.01); *G06F 2203/04107* (2013.01)

(58) Field of Classification Search
CPC ................... G06F 3/0425; G06F 3/046; G06F 2203/04106; G06F 2203/04107; G06F 2203/04102
See application file for complete search history.

(56) References Cited

U.S. PATENT DOCUMENTS 8,593,409 B1 * 11/2013 Heubel ................. G06F 3/0447
345/173
2009/0189871 A1    7/2009 Yoon
(Continued)

FOREIGN PATENT DOCUMENTS

| JP | 6086461 B1 | 3/2017 |
|----|------------|--------|
| JP | 6349048 B1 | 6/2018 |
| WO | 2018008444 A1 | 1/2018 |

OTHER PUBLICATIONS

International Search Report (ISR) dated Oct. 21, 2019, issued for International application No. PCT/JP2019/036704. (2 pages).

*Primary Examiner* — Patrick N Edouard
*Assistant Examiner* — Joseph P Fox
(74) *Attorney, Agent, or Firm* — Law Office of Katsuhiro Arai

(57) ABSTRACT

A touch panel system 1 includes: a touch panel body part V having a touch face 11 through which electromagnetic waves in the visible-light or near-infrared wavelength range transmit, and a counterface-side face 12 through which such electromagnetic waves transmit, wherein a space is provided between the touch face and the counterface-side face; a magnetic fluid 20 including a fluid blocking/absorbing such electromagnetic waves, and magnetic substance; a camera 50; an image analysis part 100; and a magnetic field control mechanism 24 for controlling the magnetic fluid by applying a magnetic field thereto. The camera captures, when an external force is applied to the touch face, the change in such electromagnetic waves resulting from the touch face and the (Continued)

counterface-side face coming closer in distance and the magnetic fluid moving from this distance-reduced location.

19 Claims, 18 Drawing Sheets

(56) References Cited

U.S. PATENT DOCUMENTS

| | | |
|---|---|---|
| 2013/0275082 A1 | 10/2013 | Follmer et al. |
| 2014/0320436 A1* | 10/2014 | Modarres ................ G06F 1/163 |
| | | 345/173 |
| 2016/0005277 A1 | 1/2016 | Gwilliam et al. |
| 2017/0148281 A1* | 5/2017 | Do ............................ G06F 3/01 |
| 2019/0235654 A1* | 8/2019 | Nishida ................... G06F 3/042 |
| 2019/0324544 A1 | 10/2019 | Suda |
| 2020/0192482 A1* | 6/2020 | Watanabe ............. G06F 3/0488 |

\* cited by examiner

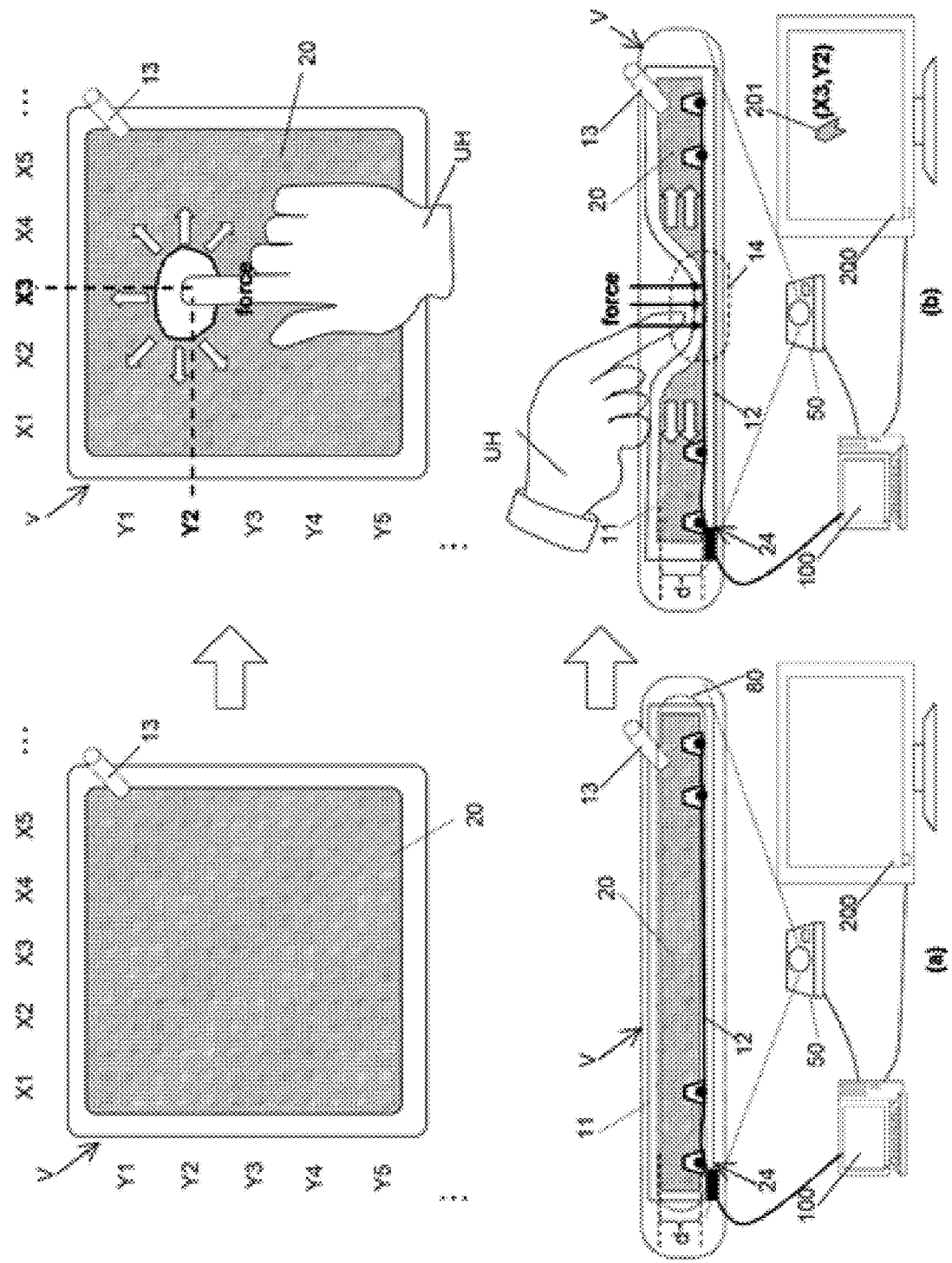
[FIG. 1]

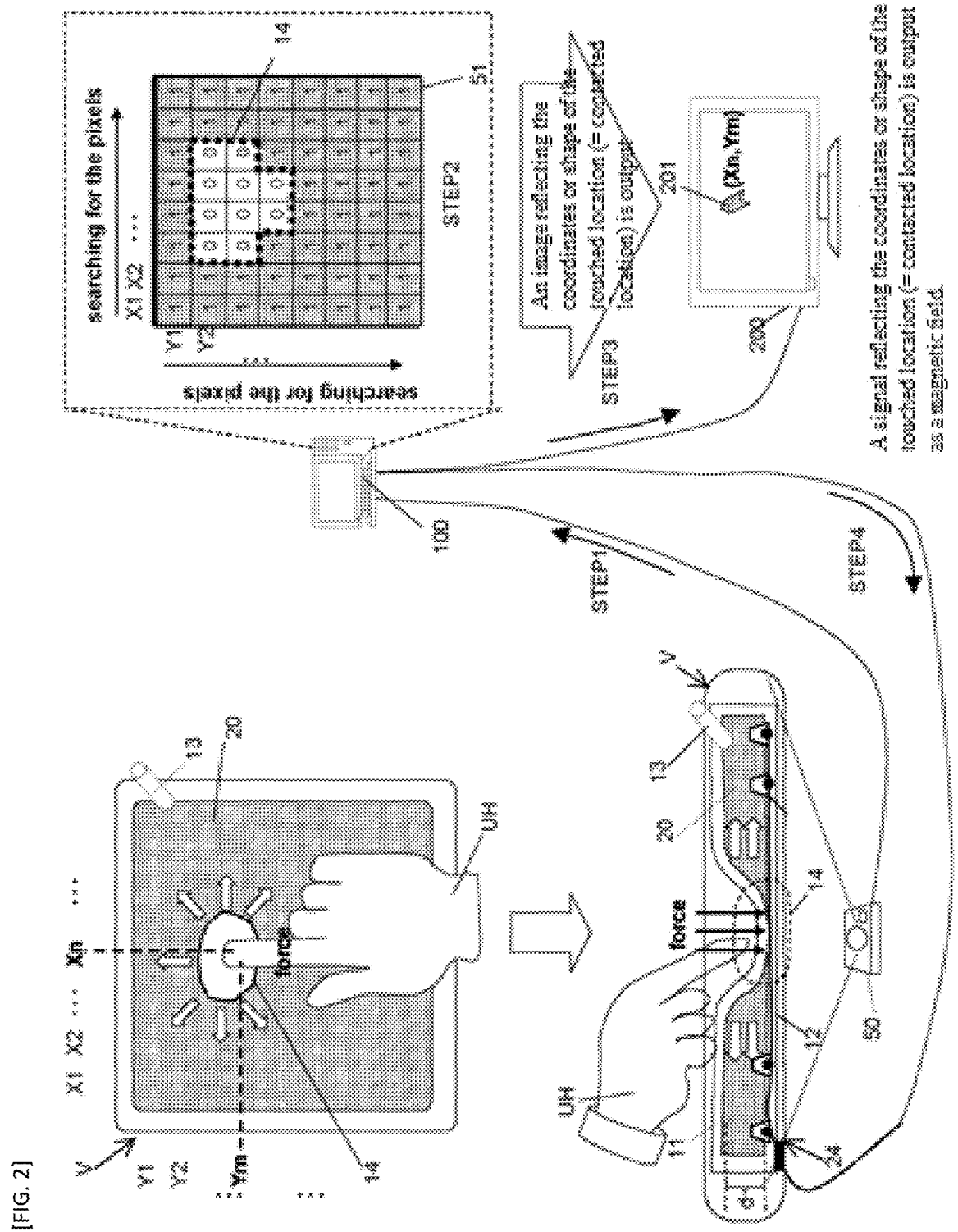
[FIG. 2]

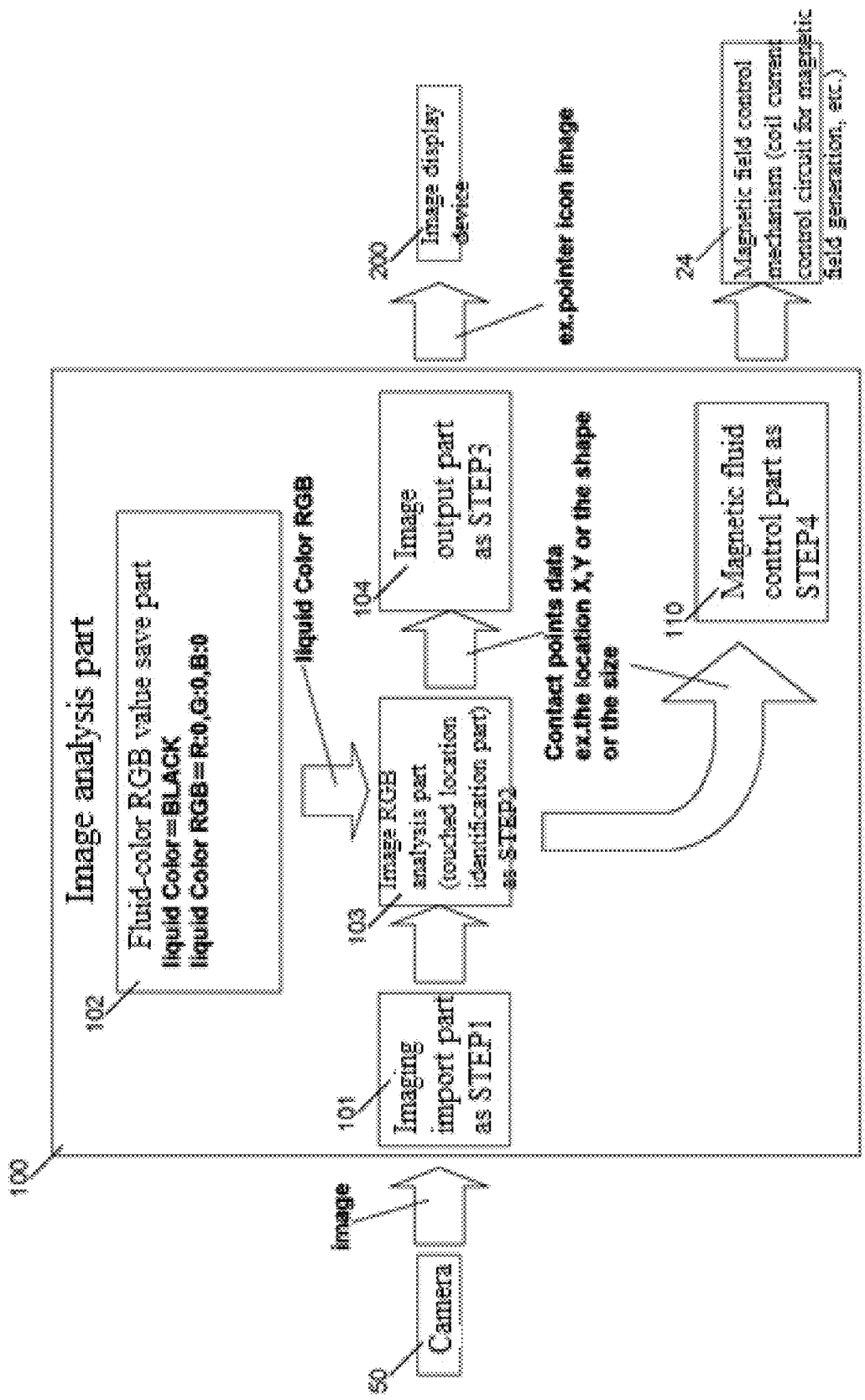
[FIG. 3]

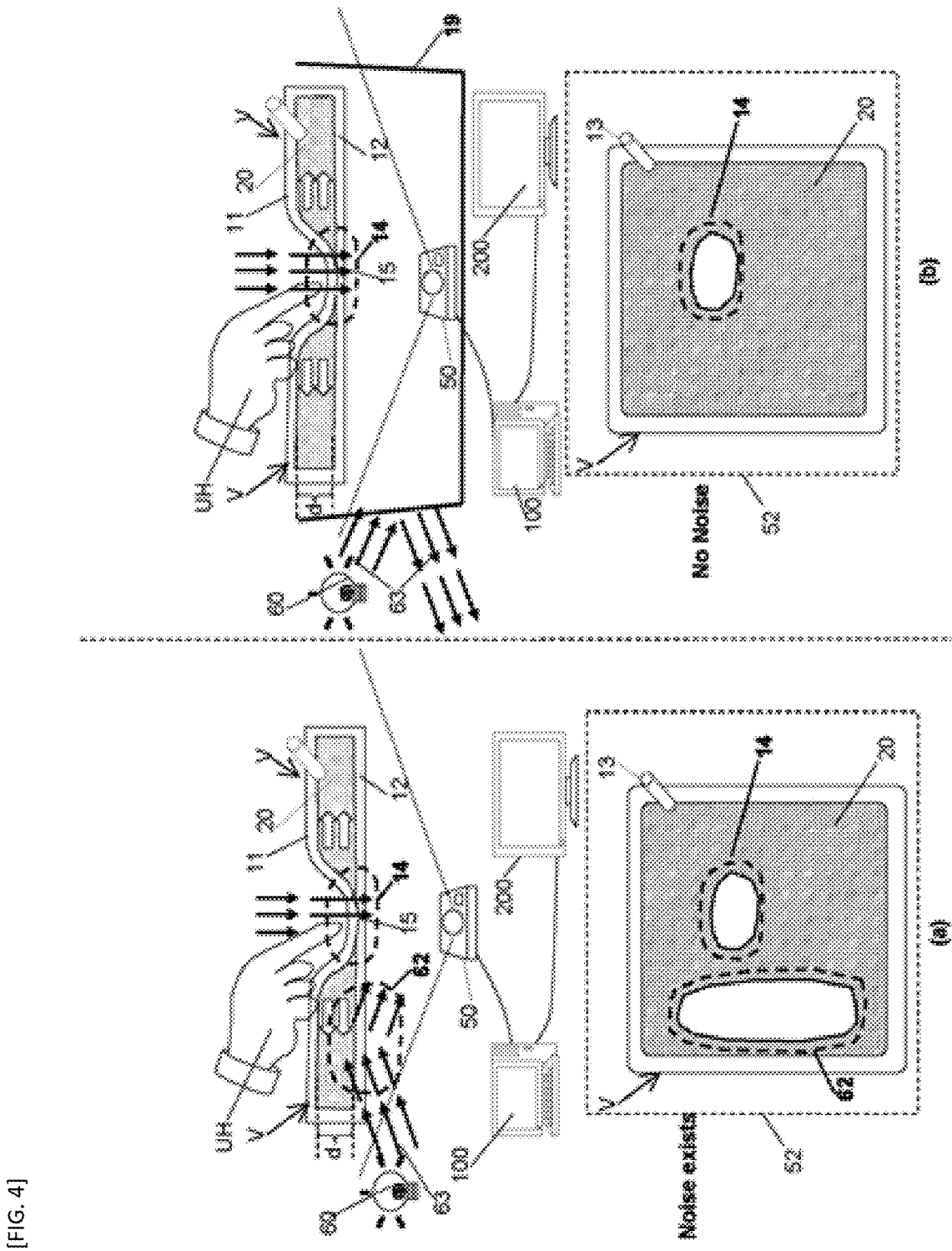
[FIG. 4]

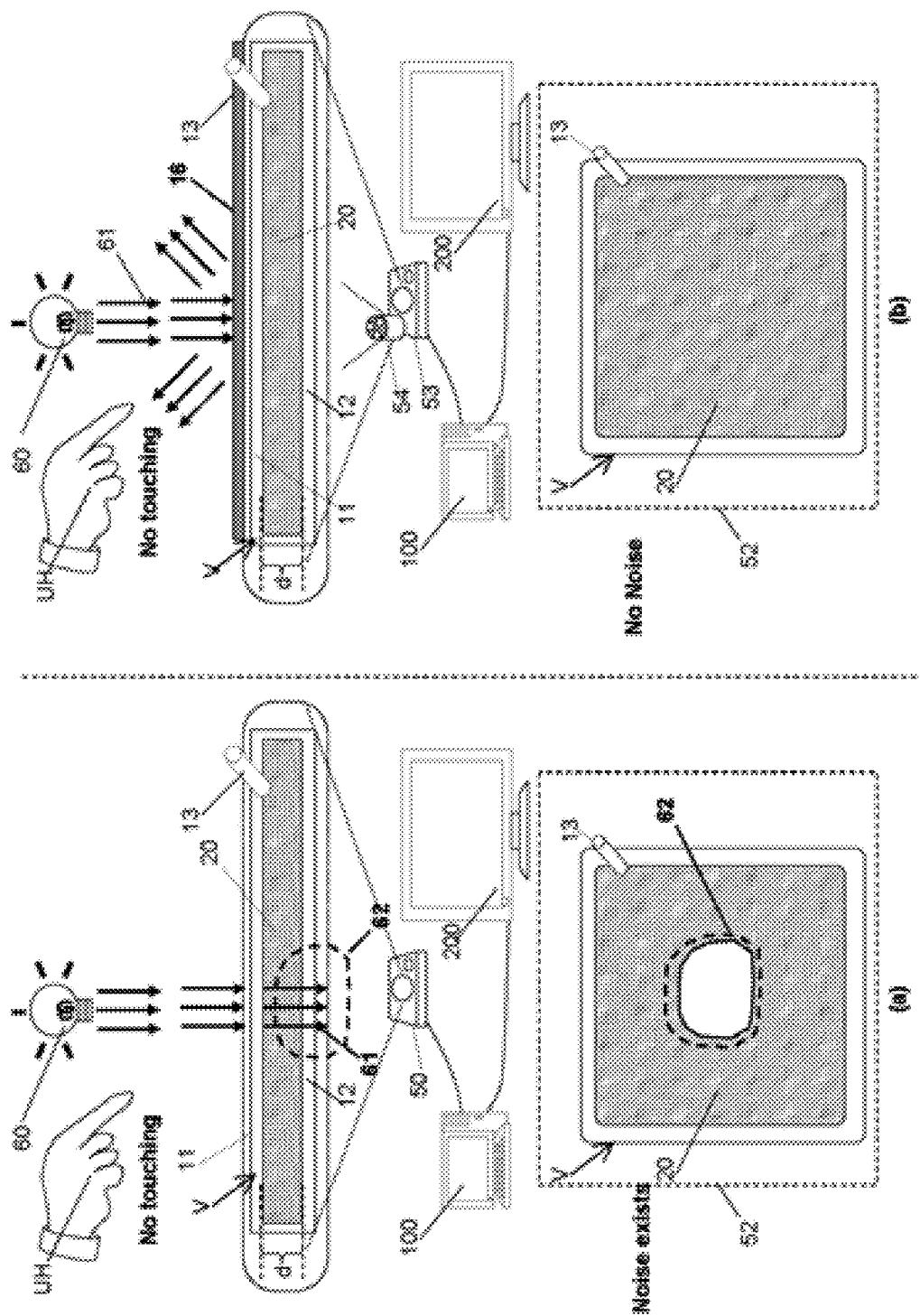
[FIG. 5]

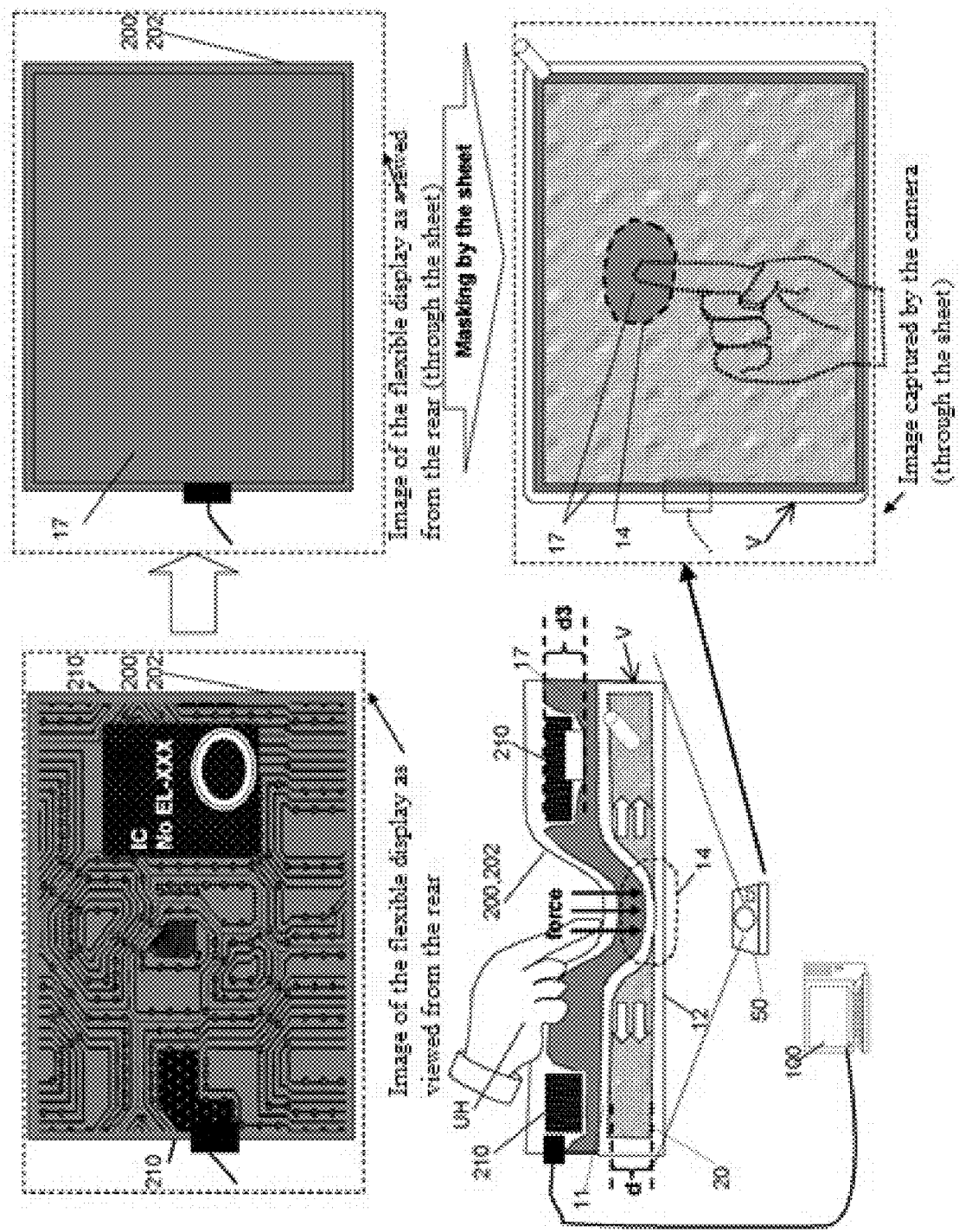
[FIG. 6]

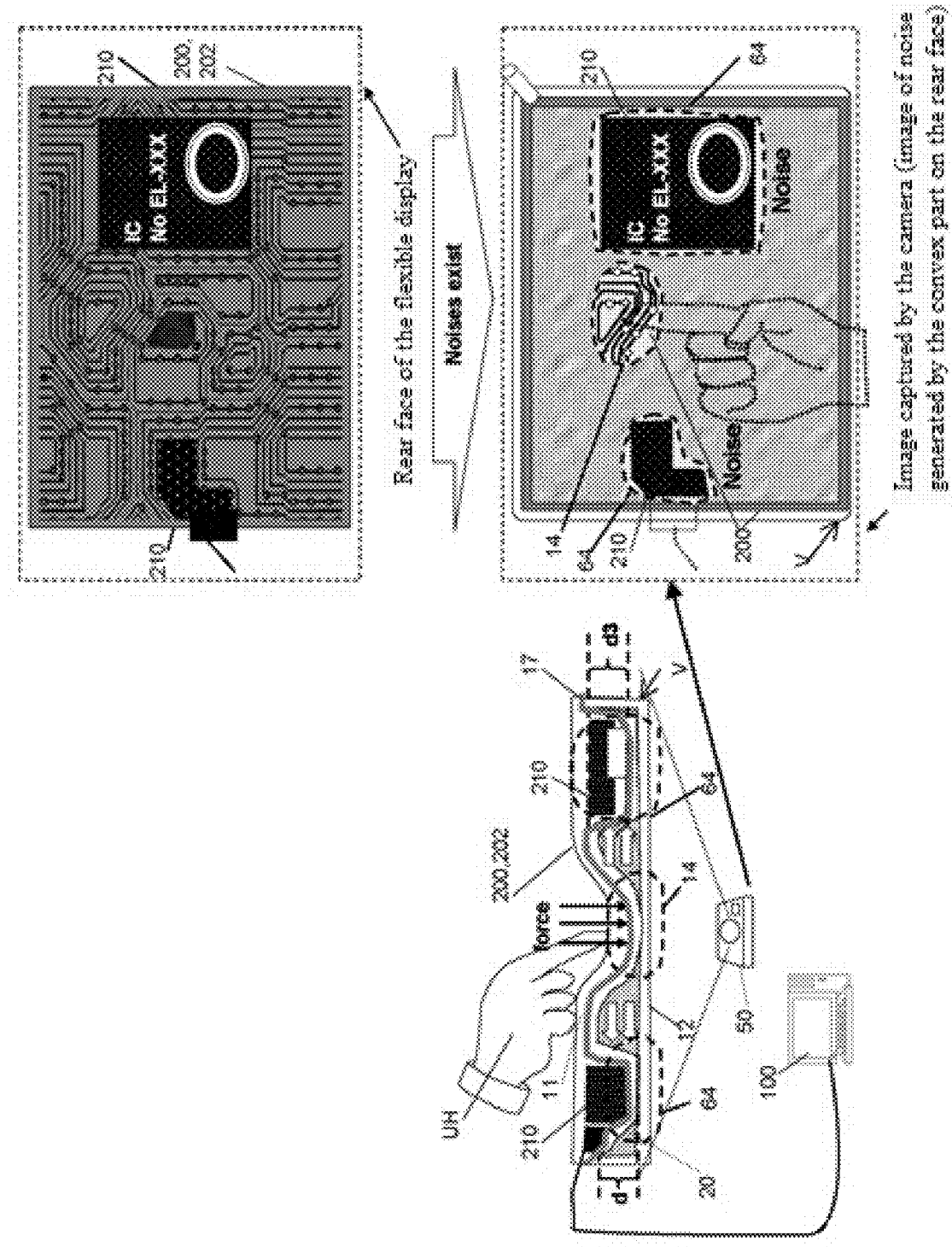
[FIG. 7]

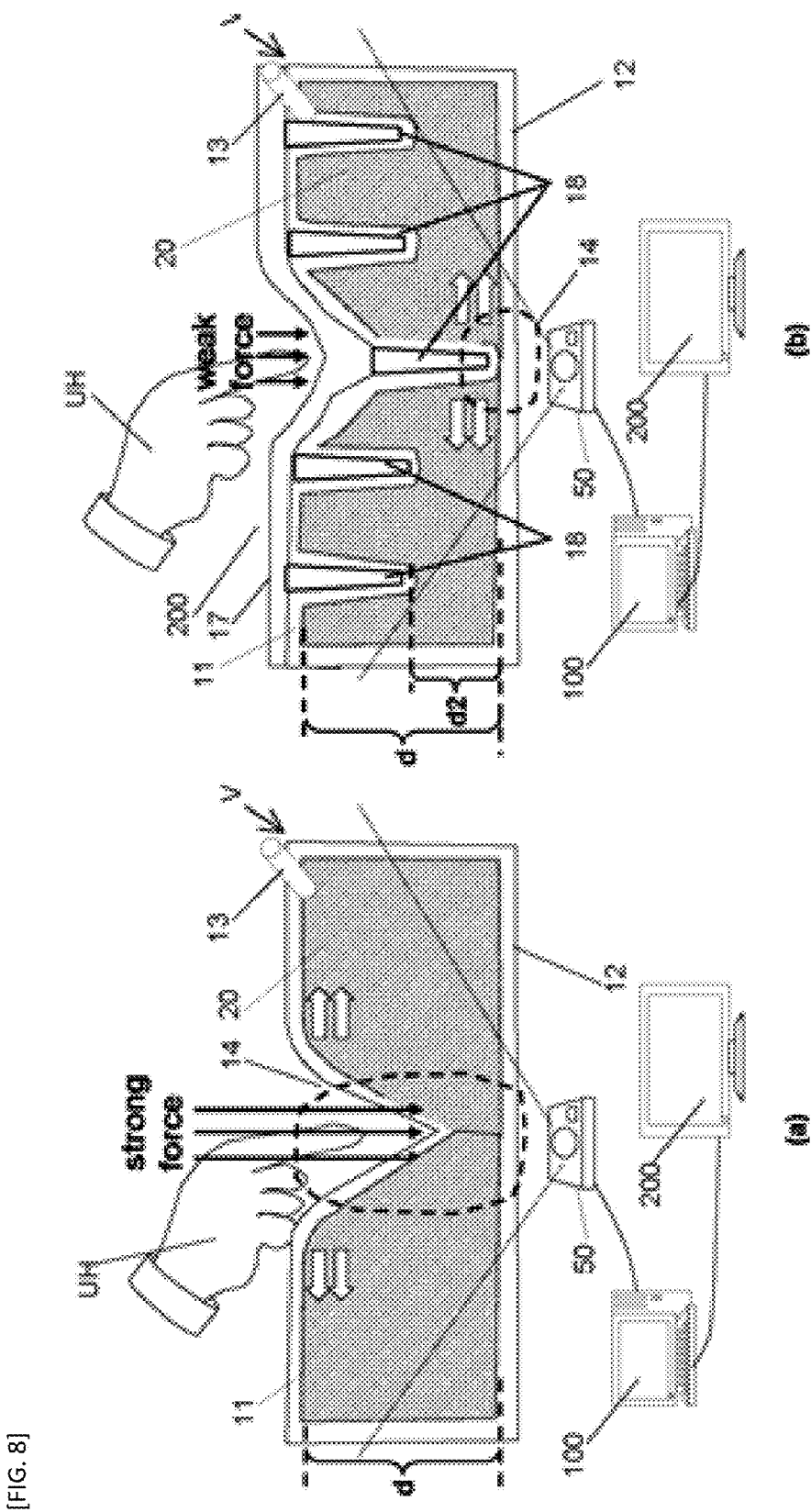
[FIG. 8]

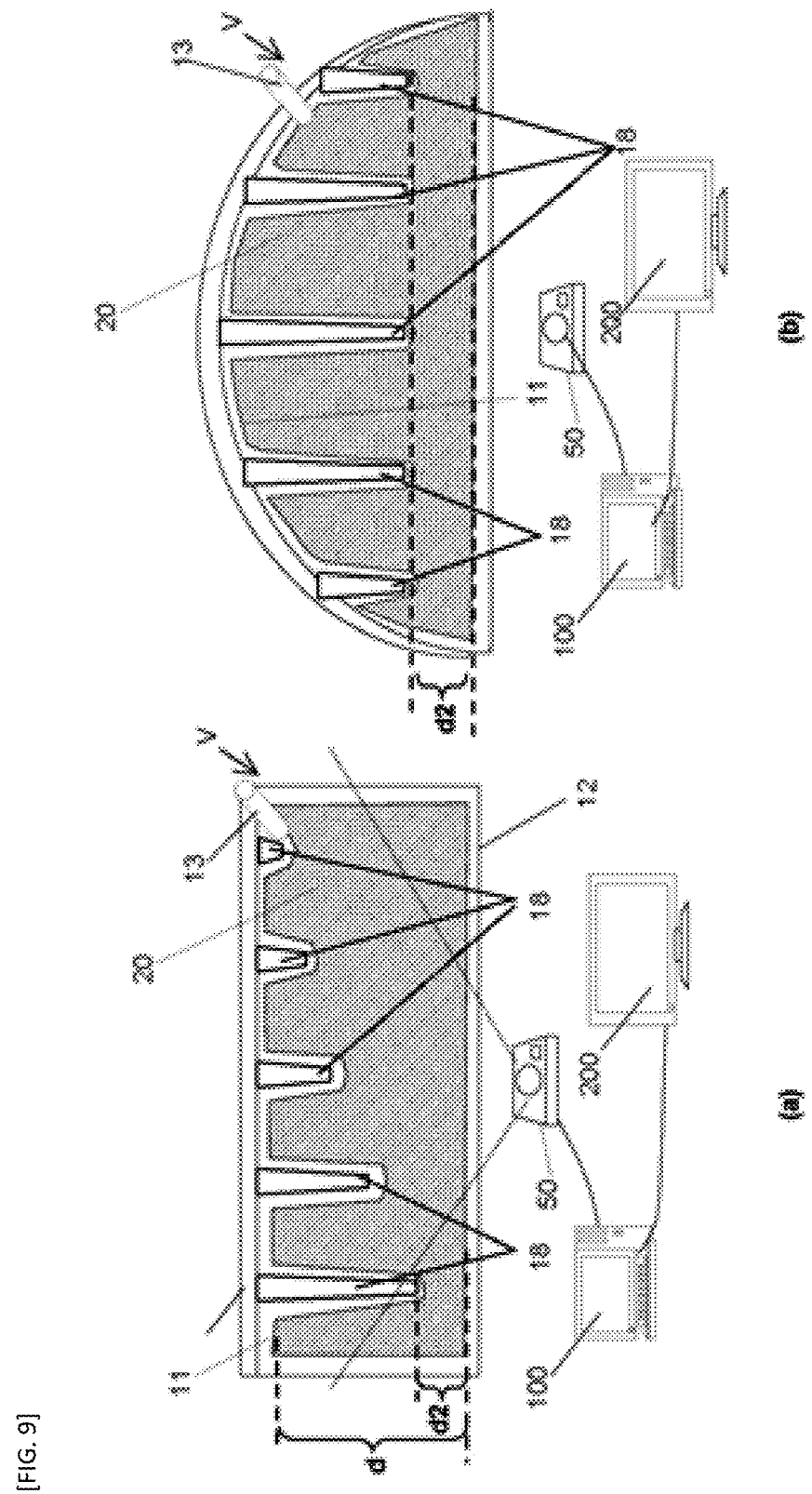
[FIG. 9]

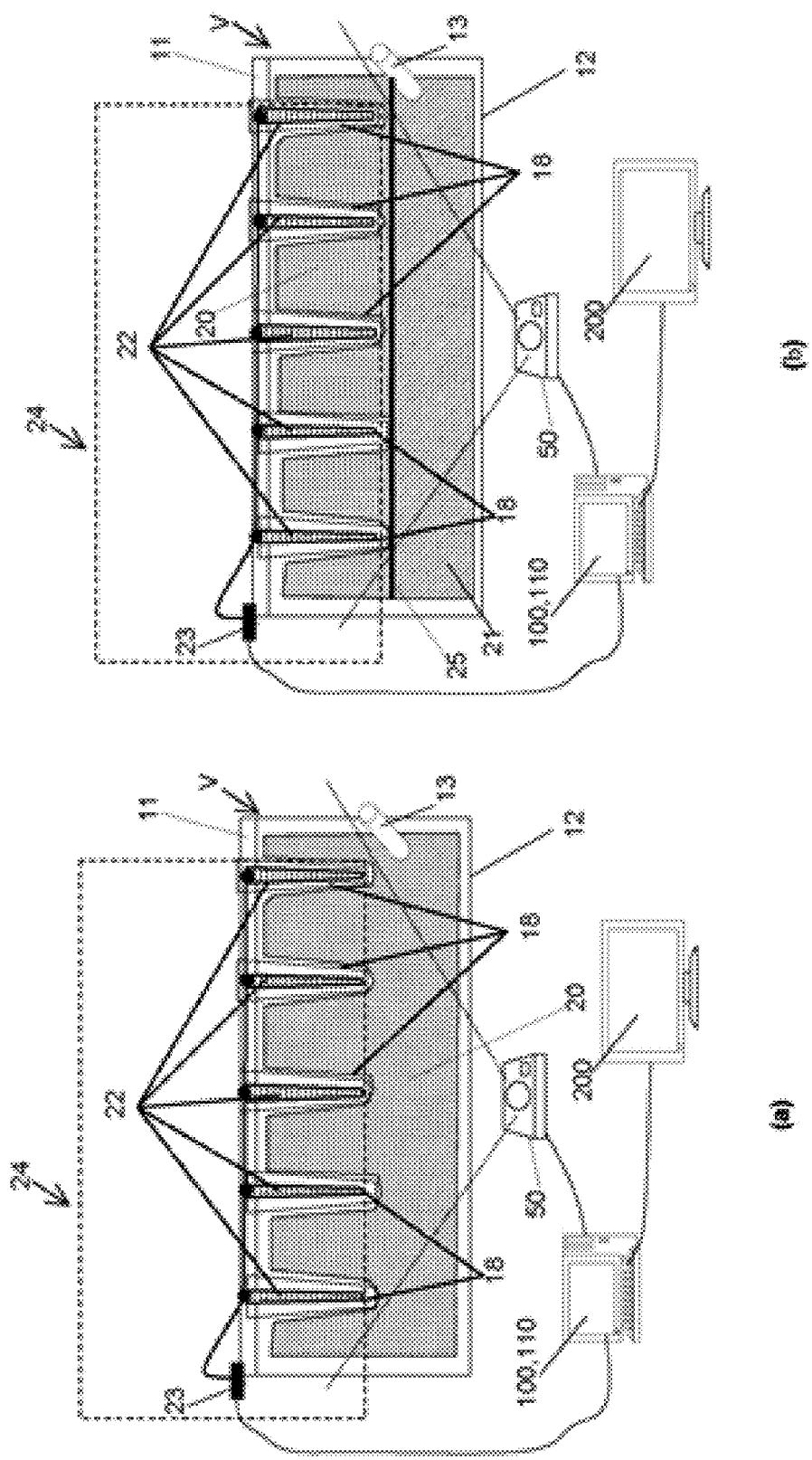
[FIG. 10]

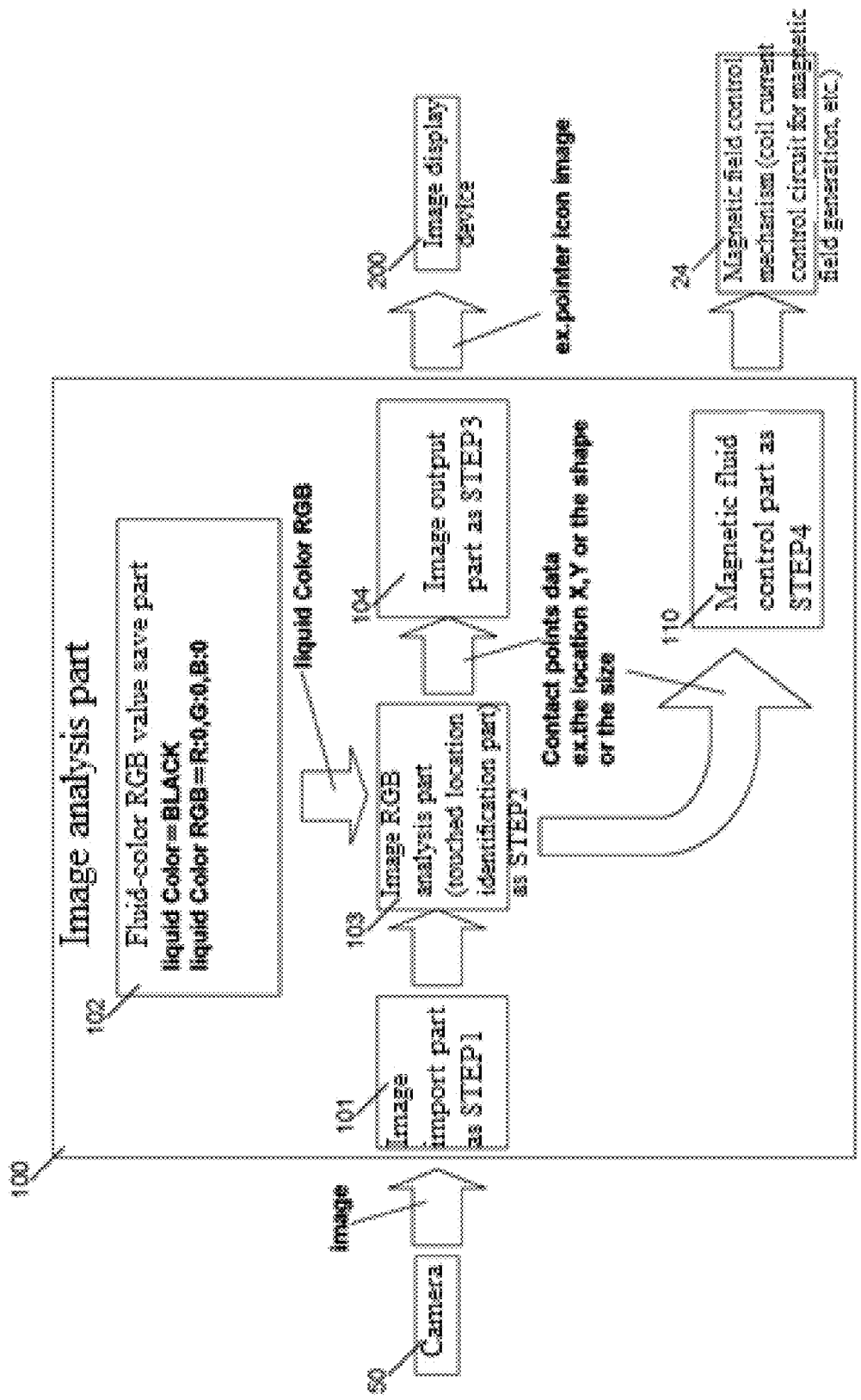

[FIG. 12]
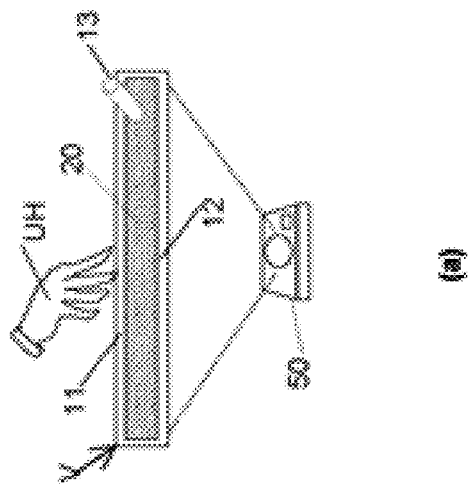
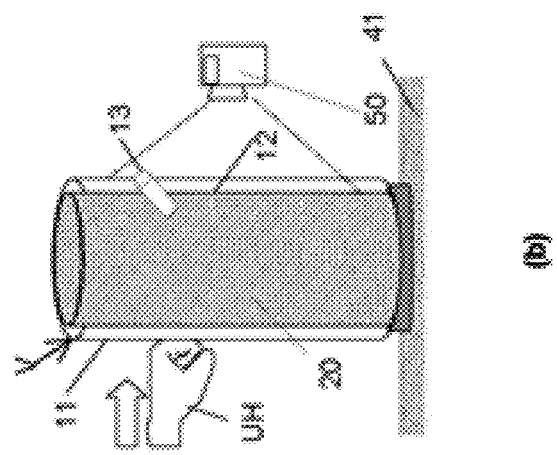
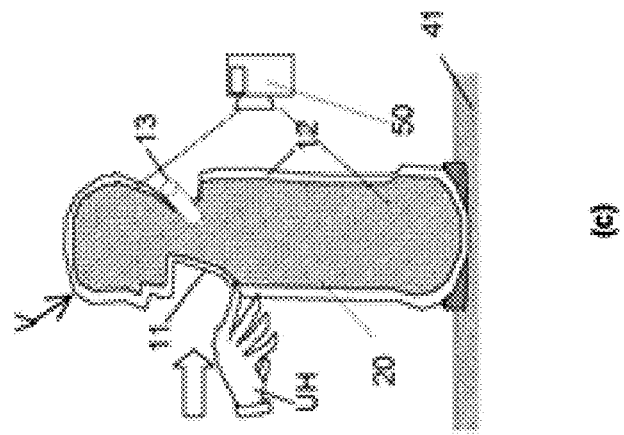

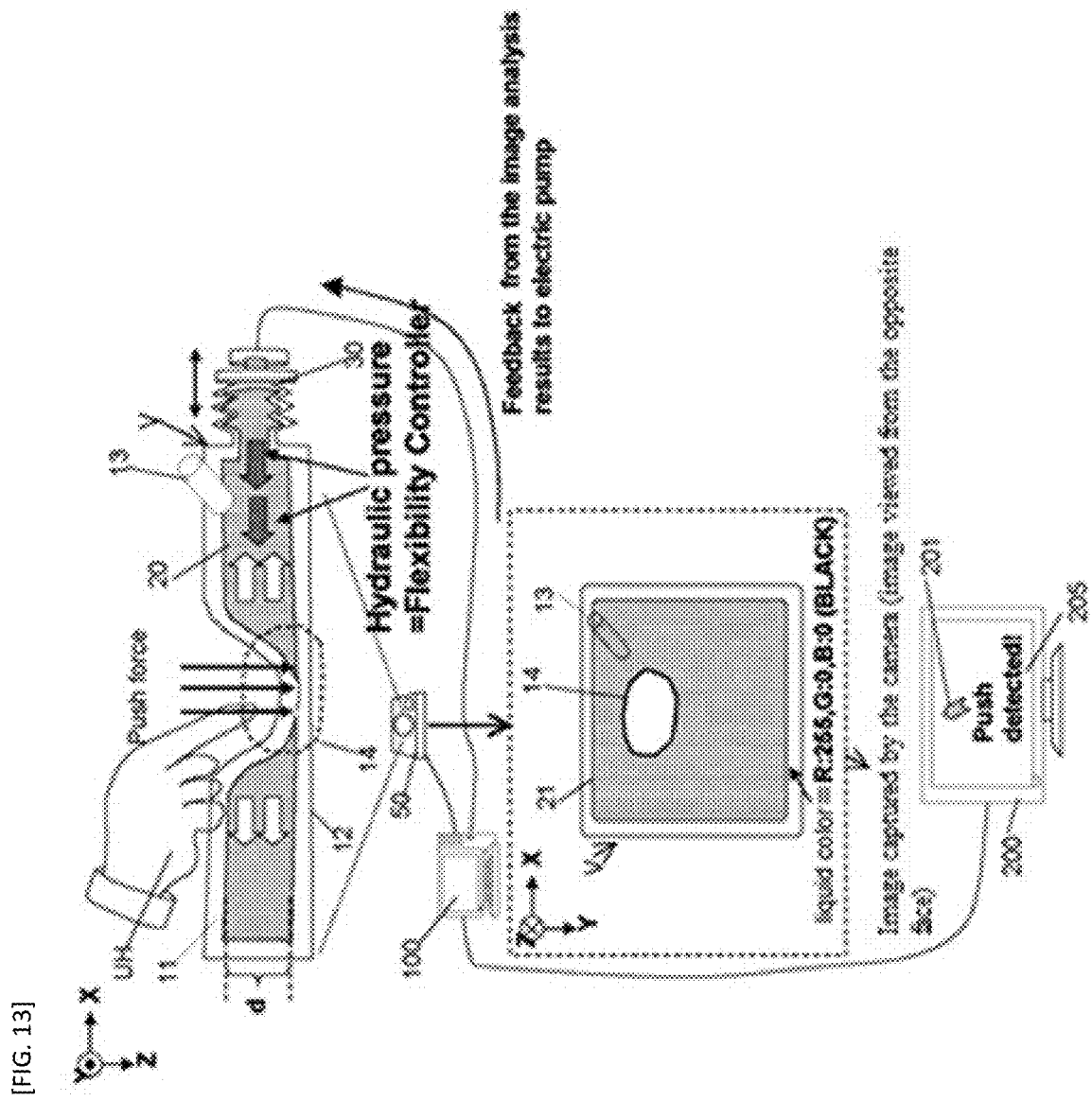
[FIG. 13]

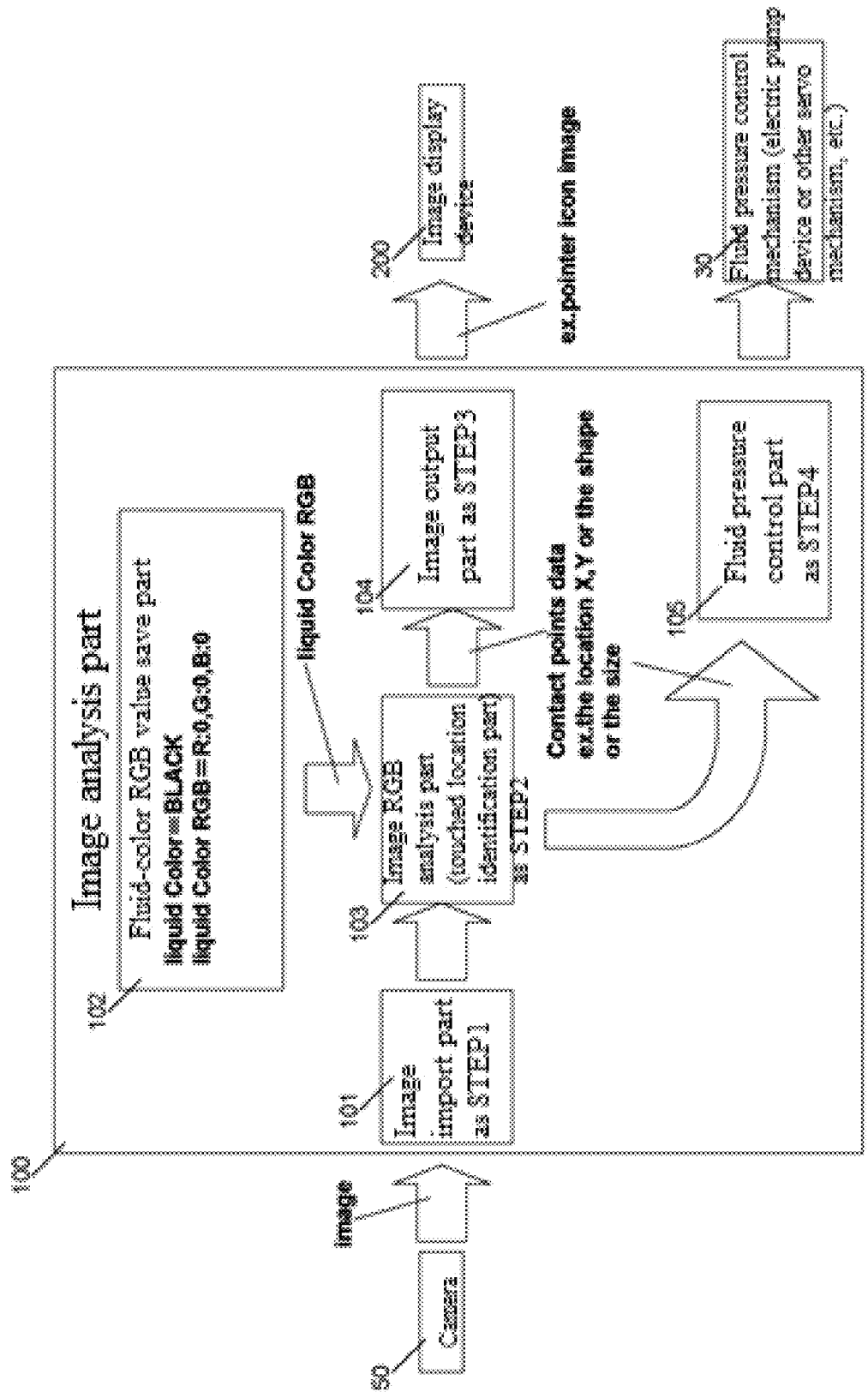
[FIG. 14]

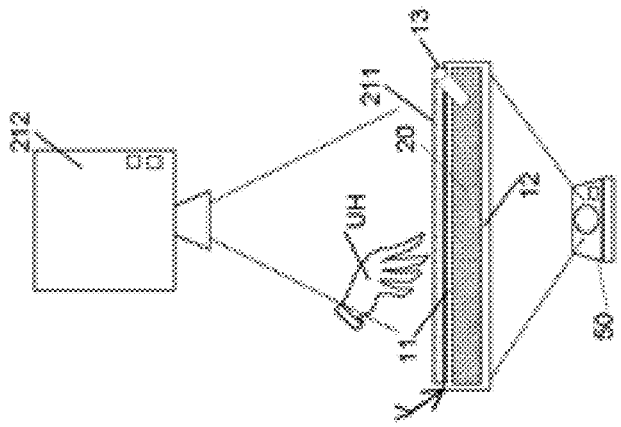
[FIG. 16]
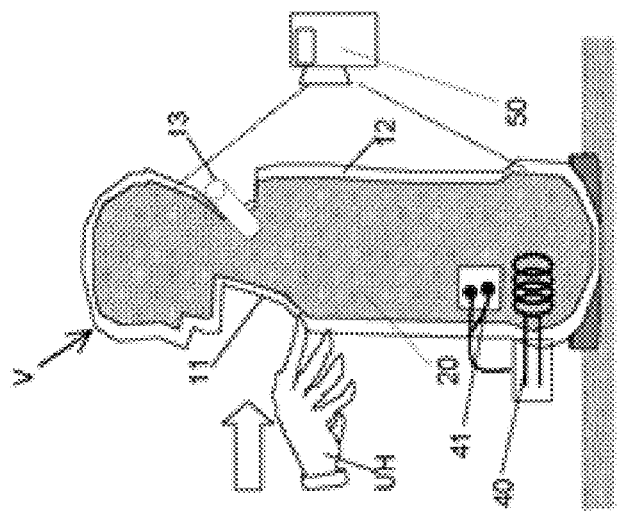
[FIG. 15]

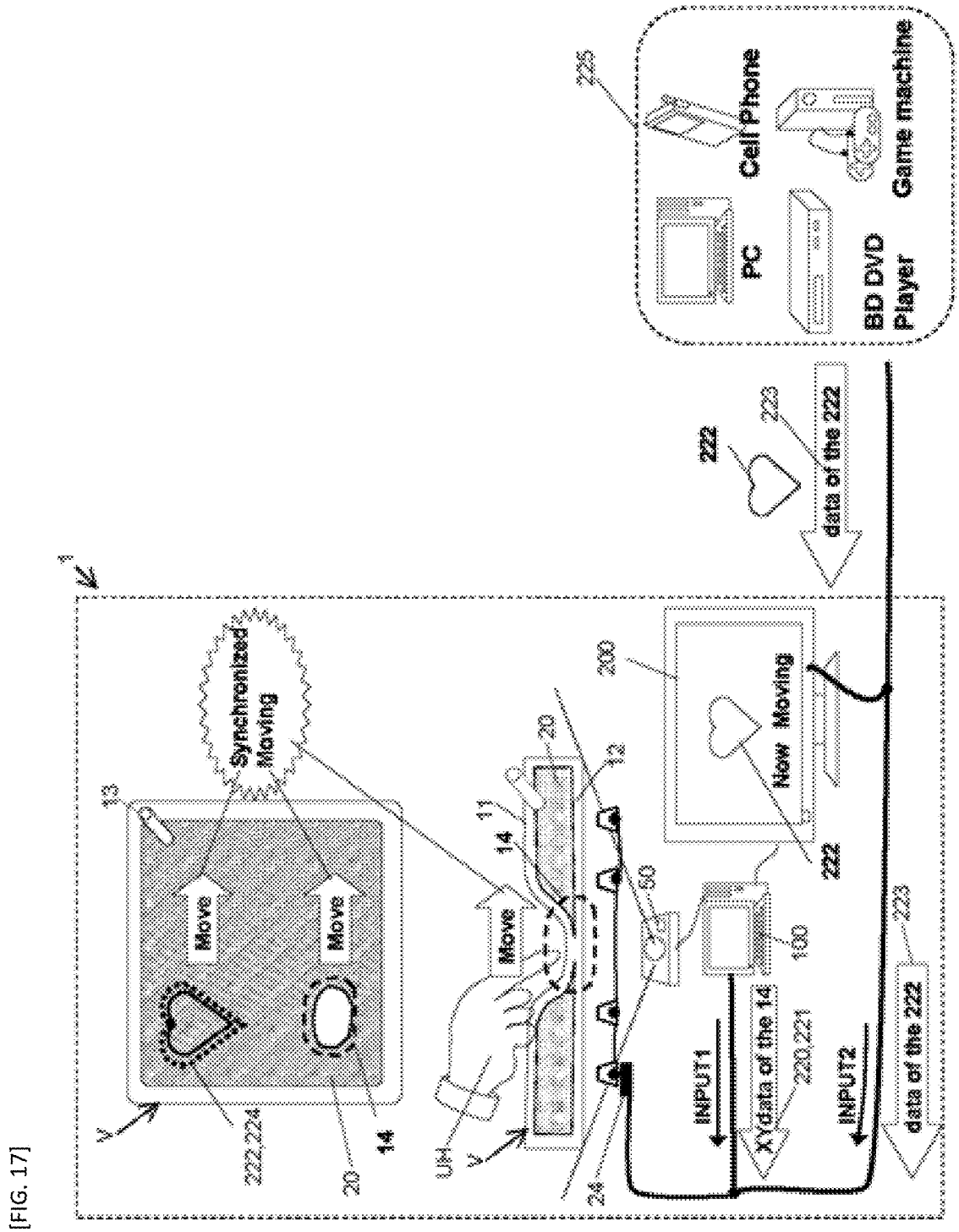

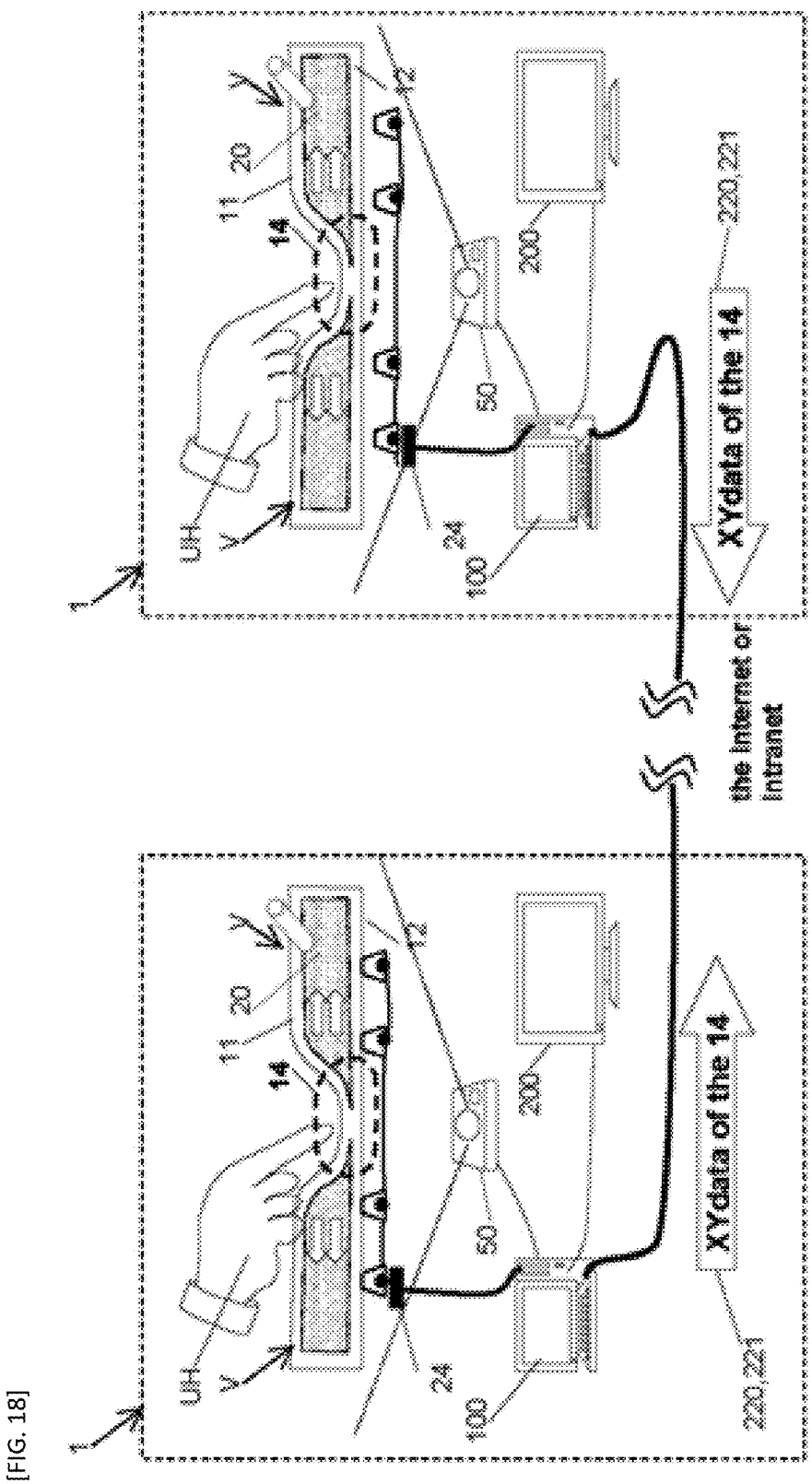

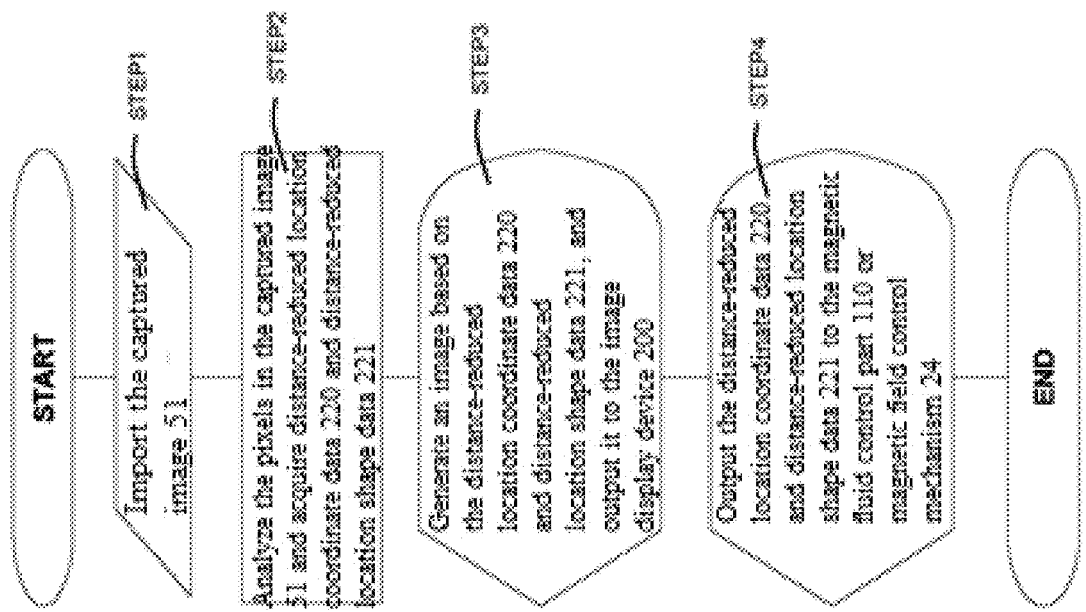
[FIG. 19]

TOUCH PANEL SYSTEM, INTERCOMMUNICATION-TYPE TOUCH PANEL SYSTEM AND RECORDING MEDIUM

CROSS-REFERENCE TO RELATED APPLICATIONS

This application is the U.S. National Phase under 35 U.S.C. § 371 of International Application PCT/JP2019/036704, filed Sep. 19, 2019, which claims priority to Japanese Patent Application No. JP2018-175500, filed Sep. 20, 2018. The International Application was published under PCT Article 21(2) in a language other than English.

TECHNICAL FIELD

The present invention relates to a touch panel system and an intercommunication-type touch panel system, both featuring a simple device constitution, insusceptibility to ambient temperature and brightness, deformability during use, and adjustability of the stiffness and cushion property of a touched location in real time, as well as a recording medium in which a program for operating such touch panel systems is stored.

BACKGROUND ART

Computers, mobile information terminals and other electronic information devices incorporate touch panel systems that each combine an input device and a display device (display).

Touch panel systems of various methods are available, such as the capacitance type, resistive membrane type, ultrasonic surface acoustic wave type, and optical type (infrared optical imaging type).

Also, a touch panel system invented by the inventor of the invention under the present application for patent comprises: a bag-shaped touch panel body part that contains a colored fluid inside; a camera; and an image analysis part that analyzes the RGB values of pixels in an image captured by the camera. When an external force is applied to the touch panel body part, one face and the other face of the touch panel body part come closer in distance and the fluid moves from this distance-reduced location, whereupon the resulting change in the color on the other face is captured by the camera and the coordinates and shape of the distance-reduced location are calculated based on the results of RGB value analysis, by the image analysis part, of the pixels in the captured image and reflected in the image on an image display device (Patent Literature 1). Because the bag-shaped touch panel body part contains a fluid inside and is therefore deformable, this touch panel system presents advantages in that a touch panel of an arbitrary shape can be formed and that the constitution is simple and manufacturing cost is low.

Additionally, the inventor of the invention under the present application for patent also invented a touch panel deformable to an arbitrary shape, that uses an infrared thermography camera and a fluid (Patent Literature 2). Recognizing, as a heat source, any position touched by the user on the touch face, the infrared thermography camera captures the electromagnetic waves (infrared light) irradiated from the heat source for use in the calculation of the coordinates of the touched location. As it utilizes the electromagnetic waves (infrared light) irradiated from a heat source and thus does not require the fluid to be colored, unlike the aforementioned invention under Patent Literature 1, this mechanism presents an advantage in that the user can view clear images through the fluid.

BACKGROUND ART LITERATURE

Patent Literature

Patent Literature 1: Japanese Patent No. 6349048
Patent Literature 2: Japanese Patent No. 6086461

SUMMARY OF THE INVENTION

Problems to be Solved by the Invention

However, systems adopting the aforementioned capacitance type, resistive membrane type, ultrasonic surface acoustic wave type and optical type (infrared optical imaging type) all have complex device constitutions and thus present such problems as high manufacturing cost and high failure rate. Another problem is that these systems cannot be used in a manner allowing the user to deform the touch panel to an arbitrary shape during use.

The aforementioned art in Patent Literature 1 presents a problem in that analyzing the RGB values of the captured image is difficult in a dark room or other low-illumination environment.

The aforementioned art in Patent Literature 2 presents problems in that it may not operate normally in a room whose temperature is close to the body temperature of the user because of thermal noise attributable to the room temperature, and that it cannot sense heat when touched by a stylus or other object that does not carry heat. Furthermore, it presents a problem in that, when the temperature of the fluid inside the touch panel body is close to the body temperature of the user, the infrared thermography camera cannot sense the location touched by the user with a finger, etc.

In light of the aforementioned problems, an object of the present invention is to provide a touch panel system and an intercommunication-type touch panel system, both featuring a simple device constitution, insusceptibility to ambient temperature and brightness, deformability during use, and adjustability of the stiffness and cushion property of a touched location in real time, as well as a recording medium in which a program for operating such touch panel systems is stored.

Means for Solving the Problems

The touch panel system proposed by the present invention comprises: a touch panel body part shaped like a bag, having a touch face made of a flexible material that lets electromagnetic waves in the visible-light or near-infrared wavelength range transmit through, and a counterface-side face with respect to the touch face made of a material that lets electromagnetic waves in the aforesaid wavelength range transmit through, wherein a space is provided in a manner sandwiched between the touch face and the counterface-side face; a magnetic fluid comprising a fluid that blocks or absorbs electromagnetic waves in the aforesaid wavelength range, and magnetic substance; a camera capable of capturing electromagnetic waves in the aforesaid wavelength range, for capturing the counterface-side face; an image analysis part for analyzing the pixels in an image captured by the camera; and a magnetic field control mechanism for controlling the magnetic fluid by applying a magnetic field thereto; wherein such touch panel system is characterized in that: the magnetic fluid is contained inside the space; the camera captures, when an external force is applied to the touch face, the change in electromagnetic waves in the aforesaid wavelength range resulting from the touch face and the counterface-side face coming closer in distance and the magnetic fluid moving from this distance-reduced location; the image analysis part calculates at least one of two things—coordinates of the distance-reduced location and shape of the distance-reduced location, on the counterface-side face—based on the analysis result of the pixels in the captured image, and reflects it in an image on an image display device; and the magnetic field control mechanism controls the magnetic field to be applied to the magnetic fluid based on the analysis result.

Also, the touch panel system proposed by the present invention is characterized in that the magnetic field control mechanism controls the magnetic field to be applied to the magnetic fluid, thereby causing at least one of two things—shape and stiffness of the touch face—to change.

Also, the touch panel system proposed by the present invention is characterized in that the magnetic field control mechanism controls the magnetic field based on at least one of two things—coordinates of the distance-reduced location and shape of the distance-reduced location.

Also, the touch panel system proposed by the present invention is characterized in that the space is divided into two layers—one on the touch face side and another on the counterface-side face side—and the magnetic fluid is contained in one of the two layers, with only the aforesaid fluid contained in the other layer.

Also, the touch panel system proposed by the present invention is characterized in that a gas that blocks electromagnetic waves in the visible-light or near-infrared wavelength range is contained, instead of the fluid, in the other layer.

Also, the touch panel system proposed by the present invention is characterized in that it has multiple projecting parts made of a material that lets electromagnetic waves in the aforesaid wavelength range transmit through, being oriented toward the space side from the touch face and/or counterface-side face.

Also, the touch panel system proposed by the present invention is characterized in that the length of the projecting part is variable.

Also, the touch panel system proposed by the present invention is characterized in that the multiple projecting parts have different lengths, respectively.

Also, the touch panel system proposed by the present invention is characterized in that the projecting part has an electromagnet or coil for generating a magnetic field.

Also, the touch panel system proposed by the present invention is characterized in that it has a fluid temperature control mechanism for controlling the temperature of the magnetic fluid.

Also, the touch panel system proposed by the present invention is characterized in that it has a fluid pressure control mechanism for controlling the pressure applied to the touch panel body part from the magnetic fluid, and the fluid pressure control mechanism controls the pressure based on at least one of three things—coordinates of the distance-reduced location, shape of the distance-reduced location, and reduced distance.

Also, the touch panel system proposed by the present invention is characterized in that the camera is capable of capturing electromagnetic waves in the visible-light wavelength range.

Also, the touch panel system proposed by the present invention is characterized in that the camera is capable of capturing electromagnetic waves in the near-infrared wavelength range.

Also, the touch panel system proposed by the present invention is characterized in that the image display device is a flexible display, and an external force is applied to the touch face via the flexible display.

Also, the touch panel system proposed by the present invention is characterized in that it has, between the flexible display and the touch face, a sheet which is flexible and thicker than the height of the convex part on the rear face of the flexible display.

Also, the touch panel system proposed by the present invention is characterized in that it has, on the surface of the touch face, an electromagnetic wave reflection sheet that reflects electromagnetic waves in the aforesaid wavelength range.

Also, the touch panel system proposed by the present invention is characterized in that it has a blocking member for preventing electromagnetic waves, other than the electromagnetic waves that have transmitted through the distance-reduced location, from entering the lens of the camera.

Also, the touch panel system proposed by the present invention is characterized in that it has a projector screen on the surface of the touch face.

Also, the touch panel system proposed by the present invention is characterized in that the magnetic field control mechanism controls the magnetic field to be applied to the magnetic fluid based on the analysis result as well as the image data of the image content displayed on the image display device.

Also, the touch panel system proposed by the present invention is characterized in that the fluid is viscous.

The intercommunication-type touch panel system proposed by the present invention is characterized in that it comprises multiple touch panel systems, each conforming to the aforementioned touch panel system, and the touch panel systems are interconnected via communication.

The recording medium proposed by the present invention is a recording medium in which a program used for the aforementioned touch panel system is stored, wherein such recording medium is characterized in that it stores a program that causes a computer to execute: a step to import the captured image; a step to analyze the pixels in the captured image; a step to calculate at least one of two things—coordinates of the distance-reduced location and shape of the distance-reduced-location, on the counterface-side face—and reflect it in the image on the image display device; and a step to let the magnetic field control mechanism control the magnetic field to be applied to the magnetic fluid based on the analysis results, thereby causing at least one of two things—shape and stiffness of the touch face—to change.

The recording medium proposed by the present invention is a recording medium in which a program used for the aforementioned intercommunication-type touch panel system is stored, wherein such recording medium is characterized in that it stores a program that causes a computer to execute: a step to import the captured image; a step to analyze the pixels in the captured image; a step to calculate at least one of two things—coordinates of the distance-reduced location and shape of the reduced-location, on the counterface-side face—and reflect it in the image on the image display device; and a step to let the magnetic field control mechanism control the magnetic field to be applied to the magnetic fluid based on the analysis results, thereby causing at least one of two things—shape and stiffness of the touch face—to change.

Effects of the Invention

The touch panel system proposed by the present invention is such that, when the user pushes the touch face of the touch panel body part with a finger, etc., and applies an external force, the touch face and the counterface-side face come closer in distance and the magnetic fluid contained inside the space in the touch panel body part moves from this distance-reduced location. The magnetic fluid can block or absorb electromagnetic waves in the visible-light or near-infrared wavelength range. Among the electromagnetic waves in the visible-light or near-infrared wavelength range, those electromagnetic waves that have reached the distance-reduced location transmit through the distance-reduced location and are captured by the camera, while other electromagnetic waves that have reached places other than the distance-reduced location are blocked or absorbed by the magnetic fluid and thus cannot be captured by the camera. The image analysis part calculates at least one of two things—coordinates of the distance-reduced location and shape of the distance-reduced location, on the counterface-side face—based on the image captured by the camera, and reflects it in the image on the image display device.

As described above, the touch panel system proposed by the present invention can use not only a standard camera capable of picking up electromagnetic waves in the visible-light wavelength range, but also a so-called night-vision camera capable of picking up electromagnetic waves in the near-infrared wavelength range. Accordingly, the touch panel system proposed by the present invention operates normally even in a low-illumination environment, and furthermore in principle it does not generate noise due to heat, unlike touch panel systems of the conventional method that use an infrared thermography camera to sense the heat from the user's finger, etc. This eliminates the possibility of malfunction even when the temperature of the ambient environment is close to the body temperature of the user. Also, the coordinates, etc., of the distance-reduced location can be calculated even when an external force is applied to the touch face by utilizing an object that does not carry heat, such as a stylus, for example.

Also, the magnetic field control mechanism can be utilized to apply a magnetic field to the magnetic fluid and cause the magnetic fluid to deform. The shape and stiffness of the touch panel body part can be changed by utilizing the pressure that applies to the touch face and counterface-side face from the inside of the space in the touch panel body part as the magnetic fluid deforms. The magnetic field control mechanism may be designed to control the magnetic field based on the pixel analysis result of the captured image by the image analysis part, or to cause the magnetic field to change based on at least one of two things—coordinates of the distance-reduced location and shape of the distance-reduced location.

As described above, the touch panel system proposed by the present invention features a simple device constitution, insusceptibility to ambient temperature and brightness, deformability during use, and adjustability of the stiffness and cushion property of a touched location in real time.

Also, the image analysis part may calculate the area of the distance-reduced location on the counterface-side face based on the pixels in the captured image, to determine that, for example, the force (external force) with which the touch face was pushed was small if the area is small, or the push force was large if the area is large. In other words, the magnitude of the force with which the user pushed the touch face may be measured, and the result is reflected in the image on the image display device or used in controlling the magnetic field to be applied to the magnetic fluid.

It should be noted that, in this Specification, electromagnetic waves in the visible-light wavelength range applicable when a standard camera is used, and electromagnetic waves in the near-infrared wavelength range applicable when a night-vision camera is used, are collectively referred to as "electromagnetic waves in a wavelength range that can be picked up by a camera."

Since a fluid (liquid) is contained inside the touch panel body part, a touch panel can be obtained that is easily deformable by the user according to the use mode and is also soft to the touch, unlike the conventional touch panels.

The space sandwiched between the touch face and the counterface-side face may be divided into a two-layer structure, where the magnetic fluid is contained in one of the two layers and only fluid is contained in the other layer. This reduces the thickness of the magnetic fluid compared to when the space consists of only one layer, which means that the magnetic fluid can be controlled with a weaker magnetic field and power can be saved when deforming the touch panel body part.

Also, the effects of the present invention can still be achieved when a gas that blocks or absorbs electromagnetic waves in the visible-light or near-infrared wavelength range is contained, instead of a fluid, in the other layer.

By providing multiple projecting parts on either the touch face or counterface-side face of the touch panel body part, the touch face and the counterface-side face of the touch panel body part can be brought closer in distance with ease, even when the amount of deformation resulting from the user's push operation is small. Put differently, a touch panel can be manufactured that can detect with high precision any deformation, even small, resulting from the user's push operation. Also, by changing the length of the projecting part, the distance (stroke distance) by which the finger, etc., moves after the touch face starts moving in the direction of the counterface-side face as an external force is applied by the finger, etc., until the image analysis part actually detects the touched state, can be adjusted arbitrarily.

The fluid temperature control mechanism may be used to adjust the temperature of the fluid to a temperature near the human body temperature, for example. It should be noted that a magnetic field may be generated by embedding a coil for generating a magnetic field in (or winding it around) the projecting part.

The fluid pressure control mechanism may be used to control the pressure to be applied to the magnetic fluid, so that the stiffness or cushion property of the touch face when touched by the user can be adjusted in real time.

A flexible display may be used as the image display device so that an external force can be applied to the touch face via the flexible display. This allows for integration of the touch panel body part and the image display device.

An electromagnetic wave reflection sheet or blocking member may be used to prevent unnecessary electromagnetic waves from reaching the camera, thereby improving the accuracy of the touch panel system.

A projector screen may be placed on the surface of the touch face in a tightly attached manner, so that light from a projector can be projected onto the projector screen. This way, a life-size, pliable touch panel system can be obtained that permits touching of images thereon.

The magnetic field control mechanism may be designed to control the magnetic field not only based on the XY coordinate data and shape data of the distance-reduced location, but also by combining the image data of the image content displayed on the image display device. Assume, for example, that an image is displayed on the image display device as an image content and the shape of a part of the touch face is changed, via a magnetic field, to the shape of this image, and the user touches this deformed location. Then, the deformed location can be deformed further using the magnetic field control mechanism according to the XY coordinate and shape data effective at the time of the user's touching. This makes it possible, for example, to synchronize the coordinates of the deformed location and the XY coordinates of the user-touched location on the touched face.

When the fluid is viscous, the user can feel a viscous, gel-like texture upon touching the touch face, and it also becomes possible to adjust the rate of deformation of the magnetic fluid according to the level of viscosity.

In the case of an intercommunication-type touch panel system comprising multiple touch panel systems, the XY coordinate data, shape data, etc., of distance-reduced locations can be transmitted and received via a communication network, which permits building of a virtual handshake system, etc., that allows users in remote locations to shake hands with each other.

BRIEF DESCRIPTION OF THE DRAWINGS

FIG. 1 Drawings (a) and (b) showing the constitution of the touch panel system

FIG. 2 An example of algorithms for determining the coordinates and shape of the distance-reduced location FIG. 3 A block diagram of the internal processing flow for image analysis FIG. 4 Drawings (a) and (b) showing the constitutions of touch panel systems with and without a blocking member FIG. 5 Drawings (a) and (b) showing the constitutions of touch panel systems with and without an electromagnetic wave reflection sheet FIG. 6 A drawing of using a flexible display as the image display device FIG. 7 A drawing showing a state where noise has generated due to the convex part on the rear face of the flexible display FIG. 8 Drawings (a) and (b) showing the constitutions of touch panel systems with and without projecting parts FIG. 9 Drawings (a) and (b) showing the projecting parts whose lengths have been changed FIG. 10 Drawings (a) and (b) showing the projecting parts in which coils for magnetic field excitation are embedded FIG. 11 A block diagram of the internal processing flow for image analysis FIG. 12 Drawings (a) to (c) showing shape variations of the touch panel body part FIG. 13 A drawing showing a state where a fluid pressure control mechanism is provided FIG. 14 A block diagram of the internal processing flow in a state where a fluid pressure control mechanism is provided FIG. 15 A drawing showing a state where a fluid temperature control mechanism is provided FIG. 16 A drawing showing a state where a projector screen is placed on the touch face FIG. 17 A drawing showing the constitution of how the magnetic field control mechanism is used to control the magnetic field to be applied to the magnetic fluid based on the analysis result and the image data of the image content displayed on the image display device FIG. 18 A drawing showing the constitution of the inter-communication-type touch panel system FIG. 19 A flow chart of the internal processing flow for image analysis

MODE FOR CARRYING OUT THE INVENTION

First Embodiment

The first embodiment of the touch panel system proposed by the present invention is described below using the drawings.

As shown in FIG. 1 to FIG. 3, the touch panel system 1 roughly comprises a touch panel body part V, a camera 50, a computer as an image analysis part 100, and a magnetic field control mechanism 24.

The touch panel body part V is shaped like a bag having a space 80 sandwiched between a touch face 11 and a counterface-side face 12.

The touch face 11 is made of a flexible material that lets electromagnetic waves in the visible-light or near-infrared wavelength range transmit through. The material of the touch face 11 may be, but is not limited to, soft vinyl chloride, low-density polyethylene or other flexible material, for example. Academically, the aforesaid wavelength range for electromagnetic waves of visible light is said to be approx. 0.4 to 0.78 [µm], while the aforesaid wavelength range for electromagnetic waves of near-infrared light is said to be approx. 0.78 to 2.5 [µm].

The counterface-side face 12 is made of a material that lets electromagnetic waves in the visible-light or near-infrared wavelength range transmit through. The material of the counterface-side face 12 may be, but is not limited to, soft vinyl chloride, low-density polyethylene, etc., for example. The counterface-side face 12 need not be flexible; however, constituting the counterface-side face also with a flexible material allows the touch panel body part V to be compressed and stored for greater portability by discharging a magnetic fluid 20 in the touch panel body part V to the exterior.

In this embodiment, the touch panel body part V has a quadrilateral shape in plan view; however, it may have a circular, triangular, pentagonal or other polygonal shape in plan view, or a shape whose cross-section along the perpendicular direction is a semicircle or a shape simulating the torso part of the human body, etc.

When the touch panel body part is entirely formed with a soft, flexible material, a clear, solid outer frame part for enclosing the periphery of the touch panel body part should be fixed to the touch panel body part in a tightly attached manner. Since the outer frame part can prevent the touch panel body part from deforming due to its own weight, the amount of deformation of the touch panel body part due to the receiving of an external force from the user can be detected accurately.

The camera 50 is capable of capturing electromagnetic waves in the visible-light or near-infrared wavelength range, and captures the counterface-side face.

If a standard camera capable of picking up electromagnetic waves of wavelengths in the visible-light range is used as the camera 50, the touch face 11 and counterface-side face 12 need to let only electromagnetic waves of wavelengths in the visible-light range transmit through. If a so-called night-vision camera capable of picking up electromagnetic waves of wavelengths in the near-infrared range is used as the camera 50, the touch face 11 and counterface-side face 12 need to let only electromagnetic waves of wavelengths in the near-infrared range transmit through. It should be noted that, in this Specification, a "night-vision camera" includes a night-vision capture system combining a so-called night-vision scope that picks up and visualizes electromagnetic waves of wavelengths in the near-infrared range, with a camera that captures images that have been visualized by the night-vision scope.

When a camera 50 equipped with a wide-angle or fish-eye type lens giving a wide view angle is used, the distance-reduced location 14 can be captured with only a single camera regardless of whether the area of the touch panel body part V (area of the touch face 11 and counterface-side face 12) is large or small, and additionally the cost of enlarging the touch panel body part V can be reduced compared to the conventional touch panels using piezoelectric elements.

A magnetic fluid 20 is contained in the space 80 in the touch panel body part V. The magnetic fluid 20 comprises a fluid that blocks or absorbs electromagnetic waves in the visible-light or near-infrared wavelength range, and a magnetic body added to this fluid.

The fluid is water or other liquid or viscous gelled liquid to which an Indian ink, charcoal, pigment used for artists' paints, or other additive, has been added. The additive needs to be added to the fluid only by a quantity that allows electromagnetic waves in the visible-light or near-infrared wavelength range to be blocked or absorbed. In other words, when the camera 50 is capable of capturing electromagnetic waves of wavelengths in the visible-light range, the additive is added to the fluid to the extent that electromagnetic waves of wavelengths in the visible-light range can be blocked or absorbed. When the camera 50 is capable of capturing electromagnetic waves of wavelengths in the near-infrared range, the additive is added to the fluid to the extent that electromagnetic waves of wavelengths in the near-infrared range can be blocked or absorbed.

Iron, ferrite or other magnetic substance in powder form is added further to the fluid containing the additive, and the mixture is used as the magnetic fluid 20. It should be noted that a surface-active agent may be added separately to help dissolve the magnetic substance in powder form in the fluid.

The magnetic fluid 20 is poured into the touch panel body part V from a fill port 13. The fluid and magnetic substance may be poured separately into the touch panel body part V from the fill port 13. By allowing the magnetic fluid 20 to be discharged to the exterior from the fill port 13, the touch panel body part V can be compressed and stored.

The user's hand UH, etc., is placed on the touch face 11 side, and the lens of the camera 50 is oriented toward the counterface-side face 12. The counterface-side face 12, made of a material transparent to electromagnetic waves in the visible-light or near-infrared wavelength range, is now masked artificially by the magnetic fluid 20.

The image analysis part 100 analyzes the pixels in an image captured by the camera 50. The image analysis part 100 may use a small computer, IC chip, ASIC, etc., installed in mobile phone terminals, instead of a standard personal computer.

It should be noted that the image analysis part 100 need not be provided partially or entirely in a computer or dedicated IC located in physical proximity to the touch panel body part V; instead, it may be provided in a large computer or cloud server capable of high-speed processing, connected by the Internet, intranet, wireless LAN or other known communication network.

The magnetic field control mechanism 24 controls the magnetic fluid 20 by applying a magnetic field thereto. By applying a magnetic field to the magnetic fluid 20, movements of the magnetic substance contained in the magnetic fluid 20 can be controlled, thereby changing the shape, stiffness, etc., of the touch face 11 and counterface-side face 12.

Next, operations of the touch panel system 1 are explained.

As shown in FIG. 1 (b), when the user's hand UH touches the touch face 11 to apply an external force and bring the touch face 11 and the counterface-side face 12 closer in distance, a distance-reduced location 14 is formed. It should be noted that the touch face 11 and the counterface-side face 12 may come in contact when the external force is applied. While the counterface-side face 12 as viewed from the camera 50 is artificially masked by the color of the magnetic fluid 20, the magnetic fluid 20 at the distance-reduced location 14 moves to the periphery thereof and thus the color around the distance-reduced location 14 is different from that of the magnetic fluid 20.

Under the present invention, this principle is utilized to detect an operation performed by the user on the touch panel body part V. To be specific, when the touch face 11 and the counterface-side face 12 come closer in distance as an external force is applied to the touch face 11, the magnetic fluid 20 moves from this distance-reduced location 14 and the resulting change in electromagnetic waves is captured by the camera 50.

The image analysis part 100 analyzes the pixels in the captured image and, based on the analysis results, calculates at least one of two things—coordinates of the distance-reduced location 14 and shape of the distance-reduced location 14, on the counterface-side face 12—and then reflects it in the image on an image display device 200.

The magnetic field control mechanism 24 controls the magnetic field to be applied to the magnetic fluid 20 based on the analysis results.

Specifically, as shown in FIG. 2, the camera 50 captures the counterface-side face 12 including the distance-reduced location 14, and the image analysis part 100 performs RGB analysis based on this captured image 51 to identify the pixels in the area not masked by the magnetic fluid 20, or specifically at the distance-reduced location 14. Then, the XY coordinates of the distance-reduced location 14 (coordinates of the distance-reduced location 14) and its shape (shape of the distance-reduced location 14) on the counterface-side face 12 are acquired and the results are output, as output values, to be reflected in the XY coordinates and shape of a pointer image 201 in the image display device 200.

Furthermore, the magnetic field control mechanism 24 excites a magnetic field reflecting the XY coordinates and shape of the distance-reduced location 14. To be specific, the electrical current needed to generate a magnetic field of the required strength is supplied to the coils in the magnetic field control mechanism 24. Then, as the shape of the magnetic substance in the magnetic fluid 20 is changed, the shape and stiffness (feel) of the touch panel body part V are changed based on the XY coordinates and shape of the distance-reduced location 14.

Some specific examples of how to control the shape of the magnetic fluid 20 using coils and electrical current are cited; if the electrical current supplied to each coil in the magnetic field control mechanism 24 is an alternating current, the frequency [Hz] and amplitude [A] of the alternating current supplied to each such coil are controlled to generate, near each such coil, a magnetic field [A/m] (or magnetic flux [Wb]) that vibrates at a different frequency [Hz]. Then, composite waves from these vibrating magnetic fields may be used to control the shape of the magnetic fluid 20 to a desired shape or shape close to what is desired. It should be noted that, if the magnetic fluid 20 is in a desired shape or shape close to it, the calculations of optimal frequency [Hz] and amplitude [A] values for the electrical current to be supplied to each coil should be done in the form of calculating approximate values beforehand or in real time using the FDTD method, finite element method (for details, refer to technical books on the finite element method or electromagnetic field analysis) or other computer-assisted numerical analysis, or performing Fourier transformation (two-dimensional Fourier transformation to be strict, because the touch face 11 has XY components) or fast Fourier transform and then assigning the results to the Ampere-Maxwell equation (for details, refer to technical books on Fourier transform mathematics and electromagnetic science). If, on the other hand, the electrical current supplied to each coil in the magnetic field control mechanism 24 when controlling the shape of the magnetic fluid 20 is a direct current, then simply the strength [A] of the direct current should be changed and optimized according to the placement interval [cm] of the coils and shape of the magnetic fluid 20.

If the camera 50 is a standard camera capable of picking up electromagnetic waves in the visible-light wavelength range, then RGB analysis (filtering) should be performed using the RGB values of the color of the magnetic fluid 20. If, on the other hand, the camera 50 is a night-vision camera capable of picking up electromagnetic waves in the near-infrared wavelength range, then filtering should be performed in the form of RGB analysis based on dark green or black color. Almost all night-vision cameras currently available on the market capture images by converting the strengths of the wavelengths of electromagnetic waves it has picked up, to gradation expression based on a single color of green or white, grayscale expression using binary color values, or the like. This means that, under the present invention, the RGB values of the captured image 51 of the counterface-side face 12 will be captured, by almost all commercially available night-vision cameras, in a masked state of being filled solid by the RGB values of a single color of dark green or black, while the distance-reduced location 14 will be captured in white or other bright color (this color varies by the model of the camera).

A specific example of the internal processing by the image analysis part 100 is shown in FIG. 3.

First, in STEP 1, an image import part 101 imports the captured image 51 of the counterface-side face 12, including the distance-reduced location 14, as captured by the camera 50. Next, in STEP 2, an image RGB analysis part 103 acquires the RGB values of the color of the magnetic fluid 20 previously saved in a fluid-color RGB value save part 102. The example of FIG. 3 is explained by assuming that the RGB values of the color masked by the magnetic fluid 20 is black, or R: 0, G: 0, B: 0. These RGB values are used to sequentially filter the pixel values of the captured image 51.

Then, the pixels in the area not colored by the color of the magnetic fluid 20 (in the example of FIG. 3, pixels whose RGB values are other than R: 0, G: 0, B: 0) are extracted and the coordinates of these pixels within the captured image 51 or their relative coordinates or shape within the counterface-side face 12 are acquired, and the results are transmitted to an image output part 104 as coordinate and shape data of the area of the distance-reduced location 14.

Lastly, in STEP 3, the image output part 104 generates a pointer image, etc., to be output to the image display device 200 based on the XY coordinate and shape data of the distance-reduced location 14. The image output part 104 outputs this image to the image display device 200.

Simultaneously, in STEP 4, the magnetic fluid control part 110 outputs a control signal according to the XY coordinate and shape data of the distance-reduced location 14, to a coil current control circuit for magnetic field generation 23 in the magnetic field control mechanism 24. The magnetic field control mechanism 24 controls the magnetic field to be applied to the magnetic substance based on the XY coordinates and shape of the distance-reduced location, and thereby changes the shape of the magnetic substance. This, in turn, changes the shape and stiffness (feel) of the touch panel body part V as a whole or changes the shape and stiffness (feel) of the distance-reduced location 14, upon which the processing ends.

It should be noted that, not only the XY coordinate and shape data of the distance-reduced location 14 being the aforementioned analysis results, but also the image data of the image content to be displayed on the image display device 200, may be transmitted to the magnetic field control mechanism 24 so that the magnetic field control mechanism 24 will combine the analysis results and the image data in controlling the magnetic field to be applied to the magnetic fluid 20.

It should be noted that, when only the XY coordinates of the distance-reduced location 14 are required and its shape data need not be acquired, there is no need to filter all pixels in the captured image 51 in STEP 2, which means that the processing can be quickened substantially by acquiring and outputting the coordinates of the pixels other than those of the color of the magnetic fluid 20 as soon as such pixels are found.

Also, the color of the magnetic fluid 20 is assumed black (RGB values are R: 0, G: 0, B: 0) for the sake of explanation in the example in FIG. 3. If the camera 50 is a night-vision camera, however, the area masked by the magnetic fluid 20 may be expressed in a color other than black depending on the model of the night-vision camera. Accordingly, a better way is to measure in advance the RGB values (color data) of the area masked by the magnetic fluid 20, and perform filtering using these values. Similarly, when the camera 50 is a standard camera that picks up electromagnetic waves of wavelengths in the visible-light range, a better way is also to measure in advance the RGB values of the area masked by the magnetic fluid 20.

It should be noted that, while this is not directly related to the present invention, a touch panel adopting the method of picking up electromagnetic waves of wavelengths in the visible-light range, like the one disclosed in Japanese Patent No. 6349048 under [Patent Literature 1], cannot be utilized in a low-illumination environment. Also, a touch panel adopting the method of picking up electromagnetic waves of wavelengths in the infrared range that transmit through fluids, like the one disclosed in Japanese Patent No. 6086461 under [Patent Literature 2], uses an infrared thermography camera and therefore touching of the touch face using an object that does not carry heat cannot be detected.

Second Embodiment

Next, the second embodiment of the present invention is explained, where attention is drawn to the fact that those locations constitutionally identical to their counterparts in the aforementioned embodiment are denoted by the same symbols and not explained.

As shown in FIG. 4 (a), presence of a high-illumination light source 60 around the camera 50 or near the counterface-side face 12 with respect to the touch panel body part V may cause light (electromagnetic waves) 63 from the high-illumination light source 60 to become noise on a captured image 52 and a location may generate which is not the distance-reduced location 14 (a falsely detected location 62).

To prevent this from happening, a member should be provided for preventing the electromagnetic waves, other than the electromagnetic waves that have transmitted through the distance-reduced location 14, from entering the lens of the camera 50. To be specific, the periphery of the space between the counterface-side face 12 and the camera 50 should be covered and sealed with a blocking member 19 constituted by a non-transparent material, metal, etc., as shown in FIG. 4 (b), to prevent the electromagnetic waves, other than the electromagnetic waves that have transmitted through the distance-reduced location, from entering the lens of the camera 50.

Third Embodiment

Next, the third embodiment of the present invention is explained, where attention is drawn to the fact that those locations constitutionally identical to their counterparts in the aforementioned embodiments are denoted by the same symbols and not explained.

As shown in FIG. 5 (a), the touch panel body part V, when placed and used under the direct sun or a mercury lamp or other high-illumination light source 60, receives the strong light (electromagnetic waves) emitted from the high-illumination light source 60. For this reason, light (electromagnetic waves) 61 transmitting through the magnetic fluid 20 from the high-illumination light source 60 may become noise and a falsely detected location 62 may result, even when the user's hand UH does not press the touch face 11.

To prevent this from happening, an electromagnetic reflection sheet 16 that reflects electromagnetic waves in the aforesaid wavelength range that can be picked up by the camera 50 should be placed on the surface of the touch face 11. To be specific, the touch face 11 should be covered with an electromagnetic reflection sheet 16 constituted by a metal foil, etc., as shown in FIG. 5 (b), so that the electromagnetic waves due to the high-illumination light source 60 will not transmit through the magnetic fluid 20 no matter how strong the illumination intensity of the high-illumination light source 60 is. This way, the accuracy of the touch panel system can be improved.

It should be noted that, when the touch panel system in this embodiment is used in an extremely-low-illumination environment, two things require careful attention.

Firstly, the material of the electromagnetic wave reflection sheet 16 must not be a material that absorbs electromagnetic waves in the aforesaid wavelength range that can be picked up by the camera. This is because, otherwise, the magnetic fluid 20 and the electromagnetic wave reflection sheet 16 will become indistinguishable as viewed from the camera 50, and this may prevent acquisition of an image of the distance-reduced location 14 and cause the accuracy of the touch panel to drop. To be specific, the contrast between the distance-reduced location 14 and the magnetic fluid 20 will decrease on the captured image 52. For this reason, the electromagnetic wave reflection sheet 16 must be made of a metal foil or other material capable of reflecting electromagnetic waves in the aforesaid wavelength range that can be picked up by the camera.

Secondly, presence of the electromagnetic wave reflection sheet 16 keeps light (electromagnetic waves) from entering the camera 50 also from the distance-reduced location 14, which means that, in an extremely-low-illumination environment, the camera 50 may not be able to properly capture the distance-reduced location 14 due to lack of light quantity. For this reason, preferably a passive night-vision camera 53 equipped with an infrared irradiation device 54 is used as the camera 50 to compensate for the lack of light quantity, as shown in FIG. 5 (b), or a light source of appropriate illumination intensity is placed near the camera 50.

Fourth Embodiment

Next, the fourth embodiment of the present invention is explained, where attention is drawn to the fact that those locations constitutionally identical to their counterparts in the aforementioned embodiments are denoted by the same symbols and not explained.

As shown in FIG. 6, a flexible display 202 is used as the image display device 200 and an external force is applied to the touch face 11 via the flexible display 202. Then, a sheet 17, which is flexible and thicker than the height of the convex part created by an IC, circuit pattern, or other rear component 210 of the flexible display 202, is placed between the flexible display 202 and the touch face 11. This way, a touch panel system can be obtained whose touch panel body part V is integrated with the flexible display 202 serving as the image display device 200.

Again, there is one thing that requires caution here, which is that, when a convex part exists due to a rear component 210 of the flexible display 202, using too thin a sheet 17 may unintentionally bring the touch face 11 and the counterface-side face 12 closer to each other by the height d3 of the convex part, as shown in FIG. 7, and a noise-induced distance-reduced location 64 may be created. To prevent this from happening, a sheet 17 having enough thickness to absorb the height d3 of the convex part due to the rear component 210 should be used to constantly absorb and flatten the convex part, as shown in FIG. 6. Or, a flexible material whose thickness is d3 or greater may be used as the electromagnetic reflection sheet 16 and sandwiched between the touch face 11 and the flexible display 202, to flatten the convex part corresponding to the rear component 210.

It should be noted that, if the aforementioned convex part is virtually non-existent behind the flexible display 202, the flexible display 202 should be directly placed and fixed on the surface of the touch face 11 without using any sheet 17.

Fifth Embodiment

Next, the fifth embodiment of the present invention is explained, where attention is drawn to the fact that those locations constitutionally identical to their counterparts in the aforementioned embodiments are denoted by the same symbols and not explained.

In general, a thickly shaped cushion is more advantageous than a thinly shaped cushion in achieving sufficient cushion property and a feel that gives a psychological perception of softness. However, if a touch panel body part V whose distance d from the touch face 11 to the counterface-side face 12 is more than 10 centimeters or in the order of several meters is constructed to increase the cushion property, a distance-reduced location 14 that can be captured by the camera 50 (part where the value of d is 0 or near 0) may not generate properly due to the excessive distance d between the touch face 11 and the counterface-side face 12, even when the touch panel body part V is pushed with a strong force, as shown in FIG. 8 (a).

One idea to solve this is to provide multiple projecting parts 18 oriented toward the space 80 side from the touch face 11, as shown in FIG. 8 (b). The projecting parts 18 are constituted by a material that lets electromagnetic waves in the aforesaid wavelength range that can be picked up by the camera 50 transmit through. As a result, the stroke distance (distance that permits detection of contact) d2 can be shortened by the length of the projecting part 18. In the example of FIG. 8, the stroke distance is shortened from d to d2 by providing the projecting parts 18. The result is that a distance-reduced location 14 can be generated without a strong force being applied by the user's hand UH or the touch face 11 or touch panel body part V deformed significantly. It should be noted that similar effects can also be achieved by providing the projecting parts 18 on the counterface-side face 12 side.

Also, by providing projecting parts 18 of different lengths on the touch face 11, as shown in FIG. 9 (a), the stroke distance d2 can be changed in each area of the touch panel body part V. Furthermore, the stroke distance d2 can be adjusted to the same value in all areas, even when a touch panel body part V whose thickness is not uniform throughout because the touch face 11 is curved is used, as shown in FIG. 9 (b). This way, by adjusting the lengths of the projecting parts 18, the stroke distance d2 can be adjusted arbitrarily in each area of the touch panel body part V. It should be noted that attachments that can be installed at the tips of the projecting parts 18 may be prepared so that they can be installed on arbitrary projecting parts 18 among the multiple projecting parts 18 to change the overall lengths of the projecting parts 18 including the attachments.

Sixth Embodiment

Next, the sixth embodiment of the present invention is explained, where attention is drawn to the fact that those locations constitutionally identical to their counterparts in the aforementioned embodiments are denoted by the same symbols and not explained.

This touch panel system is characterized in that the projecting part 18 has a coil 22 for generating a magnetic field. An electromagnet may be used in place of the coil 22.

Since a flexible, pliable material is used to constitute the touch face 11, or both the touch face 11 and the counterface-side face 12, the magnetic field generated by the coil 22 inside the touch panel body part V, or magnetic field around the touch panel body part V, may be utilized to change the shape of the magnetic substance in the magnetic fluid 20, as shown in FIG. 10.

When electrical current is supplied to an arbitrary coil 22 in a projecting part 18, a magnetic field is excited in the area near the coil 22, and accordingly the magnetic substance in the magnetic fluid 20 deforms along this magnetic field or magnetic flux. By using the coil current control circuit for magnetic field generation 23 to perform ON-OFF control to specify the area whose projecting part 18's coil 22 should be supplied with electrical current and also control the quantity of electrical current [A], the shape of the touch panel body part V or its stiffness (feel) when touched by the user's hand UH, etc., can be changed at arbitrary timings. The shape of the touch panel body part V, etc., may also be changed according to the XY coordinate and shape data of the distance-reduced location 14.

Also, the electrical current to the coil 22 may be adjusted to control the shape of the magnetic fluid 20, thereby collecting the magnetic substance around the distance-reduced location 14 or eliminating the magnetic substance from around it. This way, the area in which the distance-reduced location 14 generates can be enlarged, reduced, or forcibly erased, to permit control of shape of the distance-reduced location 14. Also, patterns or letters that move in synchronization with the coordinate movement of the distance-reduced location 14 can also be drawn, using the magnetic substance, around the distance-reduced location 14.

Also, the space 80 in the touch panel body part V may be divided into two layers—one on the touch face side 11 and another on the counterface-side face 12 side—and the magnetic fluid 20 may be contained in one of the two layers, with only the fluid 21 contained in the other layer.

To be specific, instead of containing the magnetic fluid 20 in the entire space 80 sandwiched between the touch face 11 and the counterface-side face 12 as shown in FIG. 10 (a), the space 80 is separated into two layers using a flexible sheet 25 as shown in FIG. 10 (b), and the magnetic fluid 20 is contained in one layer while the fluid 21 not containing the magnetic substance is contained in the other layer. The fluid 21 does not contain the magnetic substance, and has the property to block or absorb electromagnetic waves in the aforesaid wavelength range that can be picked up by the camera 50. It should be noted that, for the fluid 21, a gas that has been colored to block electromagnetic waves in the aforesaid wavelength range that can be picked up by the camera, or more specifically a smoke screen, etc., thick enough to block electromagnetic waves in the visible-light or near-infrared wavelength range, may be used, instead of a liquid, to reduce the weight of the touch panel body part V.

As a result, the volume of the magnetic fluid 20 decreases and thus the magnetic fluid 20 can be controlled with only a small amount of electrical current. Also, supplying a high-frequency electrical current to the coil 22 causes the magnetic fluid 20 to be excited by the magnetic field resulting from the high-frequency electrical current and vibrate in a wave-like manner; accordingly, this vibration can be transmitted to the fluid 21 via the sheet 25 to vibrate the touch panel body part V. It should be noted that the material of the sheet 25 may be any material so long as it is flexible and transparent to electromagnetic waves in the aforesaid wavelength range that can be picked up by the camera 50.

While a combination of the coil 22 and the coil current control circuit for magnetic field generation 23 was used as the magnetic field control mechanism 24, the present invention is not limited to the foregoing and a mechanism that uses a permanent magnet, electromagnet, hydraulic pressure, etc., to make objects physically come close to or move away from each other may be used.

The specific processing flow in the image analysis part 100 is shown in FIG. 11.

First, in STEP 1, the image import part 101 imports the captured image of the counterface-side face 12, including the distance-reduced location 14, as captured by the camera 50. Next, in STEP 2, the image RGB analysis part 103 acquires the RGB values of the color of the magnetic fluid 20 or fluid 21 previously saved in the fluid-color RGB value save part 102 (in the example of FIG. 11, the color of the fluid 21 is black and its RGB values are R: 0, G: 0, B: 0), and these RGB values are used to sequentially filter the pixel values of the captured image. The pixels in the area not colored by the color of the fluid 21 (in the example of FIG. 11, pixels whose RGB values are other than R: 0, G: 0, B: 0) are extracted and the coordinates of these pixels within the captured image or their relative coordinates or shape within the counterface-side face 12 are acquired, and the results are transmitted to the image output part 104 as the XY coordinate and shape data of the distance-reduced location 14.

In STEP 3, the image output part 104 generates a pointer image 201, etc., based on the XY coordinate and shape data of the distance-reduced location 14, and outputs the image to the image display device 200. After STEP 3, or simultaneously in STEP 4, the magnetic fluid control part 110 outputs a control signal according to the XY coordinate and shape data of the distance-reduced location 14, to the coil current control circuit for magnetic field generation 23 in the magnetic field control mechanism 24, to change the shape and stiffness (feel) of the touch panel body part V as a whole or change the shape and stiffness (feel) of the distance-reduced location 14, upon which the processing ends.

Seventh Embodiment

Next, the seventh embodiment of the present invention is explained, where attention is drawn to the fact that those locations constitutionally identical to their counterparts in the aforementioned embodiments are denoted by the same symbols and not explained.

As shown in FIG. 12 (c), the touch panel system in this embodiment features a touch panel body part V shaped in the likeness of human body parts, or specifically the head and the torso.

By adopting the flexible, humanoid-shaped touch panel body part V, the coordinates and shape of the distance-reduced location 14 can be acquired when the humanoid-shaped touch panel body part V is touched by the user's hand UH, and an image reflecting the results is output to the image display device 200. Besides, the touch panel body part V may also be shaped like a cylinder, as shown in FIG. 12 (b), and by using this, a boxing sandbag, etc., that lets one enjoy sparring interactively with the CG character on the image display device 200 can be constructed. Also, a function to change the shape of the hit location may be added, whereby the magnetic field is controlled to change the shape of the magnetic material in the magnetic fluid 20 to keep the hit location concaved. It should be noted that, while this is not directly related to the present invention, the touch panel body part V may be formed by adhering a soft vinyl chloride—material used for float tubes and play pools—by means of welding technology that uses high-frequency electrical current (commonly known as simply "high-frequency welding"), etc., which allows for forming of touch panel body parts V of various shapes other than human body and cylindrical shapes. Furthermore, the entire material with which to form the touch panel body part V may be a flexible material (such as the aforementioned soft vinyl chloride), in order to form a touch panel body part V that can be safely operated by the user, without getting injured, by pressing the touch panel body part V with the shin, head, tongue, external genitalia or other vital parts of the human body instead of his or her hand UH.

Eighth Embodiment

Next, the eighth embodiment of the present invention is explained, where attention is drawn to the fact that those locations constitutionally identical to their counterparts in the aforementioned embodiments are denoted by the same symbols and not explained.

As shown in FIG. 13, the touch panel system in this embodiment is characterized in that it has a fluid pressure control mechanism 30 for controlling the pressure applied to the touch panel body part V from the magnetic fluid 20, and that the fluid pressure control mechanism 30 changes the pressure based on at least one of three things—coordinates of the distance-reduced location 14, shape of the distance-reduced location 14, and reduced distance.

To be specific, an electric pump or other fluid pressure control mechanism 30 for changing the pressure of the magnetic fluid 20 is provided on the touch panel body part V. Then, by feeding back to the fluid pressure control mechanism 30 the analysis results by the image analysis part 100 regarding the image captured by the camera 50, and by changing the pressure given to the magnetic fluid 20 accordingly, the stiffness, cushion property, etc., of the touch face 11 can be adjusted in real time upon touching by the user's hand UH. For example, the stiffness, etc., of the touch face 11 or touch panel body part V can be changed by reflecting, in the driving control of the fluid pressure control mechanism 30, such position coordinate information calculated by the image analysis part 100 as the vertical and horizontal coordinates (expressed by XY coordinates in FIG. 13) of the distance-reduced location 14, and the depth by which the user's hand UH sank into the touch face 11 (reduced distance, expressed by a Z coordinate in FIG. 13).

The specific processing flow in the image analysis part 100 that applies here, is shown in FIG. 14.

In STEP 1, the image import part 101 imports the captured image of the counterface-side face 12, including the distance-reduced location 14, as captured by the camera 50.

In STEP 2, the image RGB analysis part 103 acquires the RGB values of the color of the magnetic fluid 20 previously saved in the fluid-color RGB value save part 102 (in the example of FIG. 14, the color of the magnetic fluid 20 is black and its RGB values are R: 0, G: 0, B: 0), and these RGB values are used to sequentially filter the pixel values of the captured image. Also, the pixels in the area not colored by the color of the magnetic fluid 20 (in the example of FIG. 14, pixels whose RGB values are other than R: 0, G: 0, B: 0) are extracted. Then, the coordinates of these pixels within the captured image or their relative coordinates or shape within the counterface-side face 12 are acquired, and the results are transmitted to the image output part 104 as coordinate and shape data of the distance-reduced location 14.

In STEP 3, the image output part 104 generates a pointer image, etc., based on the XY coordinate and shape data of the distance-reduced location 14, and outputs the image to the image display device 200. At this time, or simultaneously in STEP 4, the fluid pressure control part 105 (a part of the fluid pressure control mechanism 30) outputs a control signal according to the XY coordinate and shape data of the distance-reduced location 14, to the electric pump or other fluid pressure control mechanism 30, to change the pressure of the magnetic fluid 20 inside the touch panel body part V, upon which the processing ends.

Ninth Embodiment

Next, the ninth embodiment of the present invention is explained, where attention is drawn to the fact that those locations constitutionally identical to their counterparts in the aforementioned embodiments are denoted by the same symbols and not explained.

This embodiment is characterized in that a fluid temperature control mechanism for controlling the temperature of the magnetic fluid 20 is provided. Specifically, as shown in FIG. 15, a heater, cooler, or other fluid temperature control mechanism 40, and a temperature sensor 41, are provided for keeping the temperature of the magnetic fluid 20 constant, so that the temperature of the magnetic fluid 20 can be kept constant at the temperature of the human body, for example, regardless of the temperature of the ambient environment. Also, by shaping the touch panel body part V in the likeness of a human body, a touch panel system having human body-like properties in terms of both pliability and body temperature can be obtained.

It should be noted that the touch panel adopting the method that uses infrared light, as disclosed in Japanese Patent No. 6086461 under [Patent Literature 2], presents a problem in that, because human body temperature is sensed by infrared thermography under this method, the distance-reduced location 14 cannot be detected by infrared thermography if the touch panel body part V is warmed to human skin temperature as shown in FIG. 15

Tenth Embodiment

Next, the tenth embodiment of the present invention is explained, where attention is drawn to the fact that those locations constitutionally identical to their counterparts in the aforementioned embodiments are denoted by the same symbols and not explained.

As shown in FIG. 16, the touch panel system in this embodiment has a flexible or pliable projector screen 211 placed on the touch face 11 in a tightly attached manner, as the image display device 200. This way, a pliable, life-size touch panel can be obtained that permits touching of objects (specifically objects created by CG, etc.) in the images projected from a projector 212.

It should be noted that specific methods for placing the projector screen 211 on the touch face 11 in a tightly attached manner include bonding and thermal compression bonding. Also, a pocket made of a transparent material may be provided on the touch face 11 for inserting the projector screen 211 therein.

Eleventh Embodiment

Next, the eleventh embodiment of the present invention is explained, where attention is drawn to the fact that those locations constitutionally identical to their counterparts in the aforementioned embodiments are denoted by the same symbols and not explained.

As shown in FIG. 17, not only XY coordinate data 220 and shape data 221 of the distance-reduced location 14 as mentioned above, but also image data 223 of an image content 222 to be displayed on the image display device 200, may be transmitted simultaneously to the magnetic field control mechanism 24 so that the two can be combined to control the magnetic field. If a heart shape is to be displayed as an image content 222 on the image display device 200, for example, the shape of a part of the touch face 11 is deformed into this heart shape using the magnetic field, and the user touches this heart-shaped deformed location 224. Then, the deformed location 224 can be deformed further by the magnetic field control mechanism 24 according to the XY coordinate and shape data effective at the time of the user's touching. This allows, for example, for synchronization of the coordinates of the heart-shaped deformed location 224 with the XY coordinates of the location touched by the user on the touch face 11. Also, the shape and size of the heart-shaped deformed location 224 may be changed in synchronization with the XY coordinates of the location touched by the user on the touch face 11. For example, it is possible to let the deformed location 224 gradually rise and change shape from a heart to a triangle synchronously as the user moves his or her hand to the right over the touch face 11.

It should be noted that, under the present invention, a video playback device 225 that outputs the image data 223 of the image content 222 is not limited to a DVD or BD playback device, computer game equipment, or other PC or general image content playback device, and may also be a smartphone or cloud server, or a computer with an image analysis part 100. The same goes with the specifics of the image content 222, which is not limited to a heart shape, and may also be an image or movie of an object captured by a camera, or any 2D or 3D image object, human-like character image, text image, etc., created by CG.

Twelfth Embodiment

Next, the twelfth embodiment of the present invention is explained, where attention is drawn to the fact that those locations constitutionally identical to their counterparts in the aforementioned embodiments are denoted by the same symbols and not explained.

The magnetic fluid 20 may be a viscous, gelled fluid. This way, the user can have the sensations of a viscous gel upon touching the touch face 11, and the rate of deformation of the magnetic fluid 20 can also be adjusted according to the degree of viscosity. Furthermore, a viscoelastic magnetic fluid 20, which is not only viscous but also elastic, may be used so that a viscoelastic touch panel system 1 can be created.

[Embodiment of Intercommunication-Type Touch Panel System]

Next, an embodiment of the intercommunication-type touch panel system proposed by the present invention is explained, where attention is drawn to the fact that those locations constitutionally identical to their counterparts in the aforementioned embodiments are denoted by the same symbols and not explained.

As shown in FIG. 18, the intercommunication-type touch panel system comprises multiple (two, in this embodiment) touch panel systems 1 that are positioned distantly in remote locations. By interconnecting the touch panel systems 1 via communication (including the Internet, intranet, wireless LAN, serial communication and other known communications), the XY coordinate data 220 and shape data 221 of distance-reduced locations 14, or camera 50 analysis result data including such information, can be transmitted and received via a communication network, and this allows, for example, for building of a virtual handshake system that permits the users in remote locations to shake hands with each another.

[Embodiment of Recording Medium Proposed by Present Invention]

Next, the program stored in the recording medium proposed by the present invention is explained. It should be noted that, since the details of the internal processing flow relating to the acquisition of the coordinates and shape of the location touched by the user on the touch panel were already explained in each of the aforementioned embodiments, this embodiment focuses only on the processing flow of the program (software).

As shown in FIG. 19, the captured image 51 by the camera 50 is imported in STEP 1, while the pixels in the captured image 51 are analyzed in STEP 2 to acquire the distance-reduced location coordinate data 220 and distance-reduced location shape data 221 of the distance-reduced location 14 on the counterface-side face 12. In STEP 3, a pointer image 201 or other image generated based on the distance-reduced location coordinate data 220 and distance-reduced location shape data 221 is output to the image display device 200. In STEP 4, the distance-reduced location coordinate data 220 and distance-reduced location shape data 221 are output to the magnetic fluid control part 110 (magnetic field control mechanism 24) to change the shape or stiffness of the touch face 11, upon which the processing ends.

INDUSTRIAL FIELD OF APPLICATION

The present invention relates to a touch panel system featuring a simple device constitution, insusceptibility to ambient temperature, deformability during use, and detectability of the strength of the force with which it was touched by a finger, etc., while the present invention also relates to a touch panel system and an intercommunication-type touch panel system, both allowing the stiffness and cushion property of a touched location to be changed in real time, as well as a recording medium; accordingly, it has industrial applicability.

DESCRIPTION OF THE SYMBOLS d Distance from the touch face to the counterface-side face
d2 Stroke distance (distance that permits detection of contact)
d3 Height of the convex part
UH User's hand
V Touch panel body part
1 Touch panel system
11 Touch face
12 Counterface-side face
13 Fill port
14 Distance-reduced location
15 Electromagnetic wave that has transmitted through the distance-reduced location
16 Electromagnetic wave reflection sheet
17 Sheet
18 Projecting part
19 Blocking member
20 Magnetic fluid
21 Fluid
22 Coil (for magnetic field excitation)
23 Coil current control circuit for magnetic field generation
24 Magnetic field control mechanism
25 Sheet
30 Fluid pressure control mechanism
40 Fluid temperature control mechanism
41 Temperature sensor
50 Camera
51 Captured image (image used for image analysis)
52 Captured image (image viewed from the counterface-side face)
53 Passive night-vision device camera
54 Infrared irradiation device
60 High-illumination light source
61 Light (electromagnetic waves) transmitting through the magnetic fluid from the high-illumination light source
62 Falsely detected location
63 Light (electromagnetic waves)
64 Noise-induced distance-reduced location
80 Space
100 Image analysis part (computer)
101 Image import part
102 Fluid-color RGB value save part
103 Image RGB analysis part
104 Image output part
105 Fluid pressure control part
110 Magnetic fluid control part
111 Coil current control part for magnetic field generation
200 Image display device
201 Pointer image
202 Flexible display
210 Rear component
211 Projector screen
212 Projector
220 Distance-reduced location coordinate data
221 Distance-reduced location shape data
222 Image content
223 Image data
224 Deformed location
225 Video playback device

What is claimed is:
1. A touch panel system, comprising:
a touch panel body part shaped like a bag, having a touch face made of a flexible material that lets electromagnetic waves in a visible-light or near-infrared wavelength range transmit through, and a counterface-side face with respect to the touch face made of a material that lets the electromagnetic waves in said wavelength range transmit through, wherein a space is provided in a manner sandwiched between the touch face and the counterface-side face;
a magnetic fluid comprising a fluid that blocks or absorbs the electromagnetic waves in the aforesaid wavelength range, and a magnetic substance;
a camera capable of capturing electromagnetic waves in the aforesaid wavelength range, for capturing such electromagnetic waves at the counterface-side face;
an image analysis part for analyzing pixels in an image captured by the camera; and
a magnetic field control mechanism for controlling the magnetic fluid by applying a magnetic field thereto;
the touch panel system characterized in that:
the magnetic fluid is contained inside the space;
the camera captures, when an external force is applied to the touch face, a change in electromagnetic waves in the aforesaid wavelength range resulting from the touch face and the counterface-side face coming closer in distance and the magnetic fluid moving from a distance-reduced location;
the image analysis part calculates at least one of two things—coordinates of the distance-reduced location and shape of the distance-reduced location, on the counterface-side face—based on an analysis result of the pixels in the captured image, and reflects the calculated at least one of the two things in an image on an image display device; and the magnetic field control mechanism controls the magnetic field to be applied to the magnetic fluid based on the analysis result.

2. The touch panel system according to claim 1, characterized in that the magnetic field control mechanism controls the magnetic field to be applied to the magnetic fluid, thereby causing at least one of two things—shape and stiffness of the touch face—to change.

3. The touch panel system according to claim 1, characterized in that the magnetic field control mechanism controls the magnetic field based on at least one of two things—the coordinates of the distance-reduced location and the shape of the distance-reduced location.

4. The touch panel system according to claim 1, characterized in that the space is divided into two layers—one on the touch face side and another on the counterface-side face side—and the magnetic fluid is contained in one layer of the two layers, and only the aforesaid fluid, which is the fluid that blocks or absorbs the electromagnetic waves without the magnetic substance, is contained in another layer.

5. The touch panel system according to claim 4, characterized in that the aforesaid fluid is a gas that blocks electromagnetic waves in the visible-light or near-infrared wavelength range is contained in the another layer.

6. The touch panel system according to claim 1, characterized in that it has multiple projecting parts made of a material that lets electromagnetic waves in the aforesaid wavelength range transmit through, being oriented toward the space from the touch face and/or counterface-side face.

7. The touch panel system according to claim 6, characterized in that a length of each projecting part is variable.

8. The touch panel system according to claim 6, characterized in that the multiple projecting parts have different lengths, respectively.

9. The touch panel system according to claim 6, characterized in that the projecting parts have an electromagnet or coil for generating a magnetic field.

10. The touch panel system according to claim 1, characterized in that it has a fluid temperature control mechanism for controlling a temperature of the magnetic fluid.

11. The touch panel system according to claim 1, characterized in that it has a fluid pressure control mechanism for controlling a pressure applied to the touch panel body part from the magnetic fluid, and the fluid pressure control mechanism controls the pressure based on at least one of three things—the coordinates of the distance-reduced location, the shape of the distance-reduced location, and reduced distance.

12. The touch panel system according to claim 1, characterized in that the camera is capable of capturing electromagnetic waves in a visible-light wavelength range.

13. The touch panel system according to claim 1, characterized in that the camera is capable of capturing electromagnetic waves in a near-infrared wavelength range.

14. The touch panel system according to claim 1, characterized in that the image display device is a flexible display, and an external force is applied to the touch face via the flexible display.

15. The touch panel system according to claim 14, characterized in that it has, between the flexible display and the touch face, a sheet which is flexible and thicker than a height of a convex part on a rear face of the flexible display.

16. The touch panel system according to claim 1, characterized in that it has, on a surface of the touch face, an electromagnetic wave reflection sheet that reflects electromagnetic waves in the aforesaid wavelength range.

17. The touch panel system according to claim 1, characterized in that it has a blocking member for preventing electromagnetic waves, other than the electromagnetic waves that have transmitted through the distance-reduced location, from entering a lens of the camera.

18. The touch panel system according to claim 1, characterized in that it has a projector screen on a surface of the touch face.

19. A non-transitory recording medium in which a program used for the touch panel system according to claim 1 is stored, the recording medium characterized by storing the program that causes a computer to execute: importing the captured image; analyzing pixels in the captured image; calculating at least one of two things—the coordinates of the distance-reduced location and the shape of the distance-reduced location, on the counterface-side face—and reflect the calculated at least one of the two things in an image on the image display device; and making the magnetic field control mechanism control the magnetic field to be applied to the magnetic fluid based on the analysis result, thereby causing at least one of two things—a shape and a stiffness of the touch face—to change.

* * * * *